United States Patent
Turkyilmaz et al.

(10) Patent No.: US 12,229,340 B2
(45) Date of Patent: Feb. 18, 2025

(54) SELECTIVE LASER ETCHING OF LAYERED FLUIDISTORS

(71) Applicant: META PLATFORMS TECHNOLOGIES, LLC, Menlo Park, CA (US)

(72) Inventors: Serol Turkyilmaz, Redmond, WA (US); Daniel Myers, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 1099 days.

(21) Appl. No.: 17/123,683

(22) Filed: Dec. 16, 2020

(65) Prior Publication Data

US 2021/0397259 A1 Dec. 23, 2021

Related U.S. Application Data

(60) Provisional application No. 63/041,256, filed on Jun. 19, 2020.

(51) Int. Cl.
| | |
|---|---|
| *G06F 3/01* | (2006.01) |
| *C03B 23/20* | (2006.01) |
| *C03C 15/00* | (2006.01) |
| *F16K 15/02* | (2006.01) |
| *F16K 27/10* | (2006.01) |

(Continued)

(52) U.S. Cl.
CPC .............. *G06F 3/016* (2013.01); *C03B 23/20* (2013.01); *C03C 15/00* (2013.01); *F16K 15/023* (2013.01); *F16K 27/102* (2013.01); *F16K 99/0005* (2013.01); *F16K 99/0059* (2013.01); *F16K 2099/0074* (2013.01); *F16K 2099/008* (2013.01); *G02B 2027/0192* (2013.01)

(58) Field of Classification Search
CPC .......... G06F 3/016; G06F 3/014; G06F 3/011; C03B 23/20; C03C 15/00; C03C 23/0025; F16K 15/023; F16K 27/102; F16K 2099/0074; F16K 2099/008; F16K 99/0005; F16K 99/0059; G02B 2027/0192

See application file for complete search history.

(56) References Cited

U.S. PATENT DOCUMENTS

| | | | |
|---|---|---|---|
| 2002/0117643 A1* | 8/2002 | Winger | F15C 5/00 251/129.06 |
| 2009/0039057 A1* | 2/2009 | Crockett | F16K 27/003 216/55 |

(Continued)

OTHER PUBLICATIONS

Hermans et al., "Selective, Laser-Induced Etching of Fused Silica at High Scan-Speeds Using KOH", JLMN—Journal of Laser Micro/Nanoengineering, vol. 9, No. 2, 2014, pp. 126-131.

(Continued)

*Primary Examiner* — Marina A Tietjen
(74) *Attorney, Agent, or Firm* — Greenberg Traurig, LLP

(57) ABSTRACT

A method includes separately exposing selected portions of a first rigid substrate and a second rigid substrate to laser radiation, selectively etching the exposed portions of the first rigid substrate and the second rigid substrate using a chemical etchant and bonding the first rigid substrate to the second rigid substrate along a common interface to form a fluidic valve. The fluidic valve may be coupled to a fluidic haptics device, for example, which may be integrated into an artificial reality system.

9 Claims, 13 Drawing Sheets

(51) Int. Cl.
*F16K 99/00* (2006.01)
*G02B 27/01* (2006.01)

(56) References Cited

U.S. PATENT DOCUMENTS

| | | | | |
|---|---|---|---|---|
| 2009/0185955 A1* | 7/2009 | Nellissen | ..... | B01L 3/502738 422/68.1 |
| 2013/0045144 A1* | 2/2013 | Perozziello | ..... | F16K 99/0015 422/502 |
| 2018/0179051 A1* | 6/2018 | Keller | ..... | G06F 3/016 |

OTHER PUBLICATIONS

"SLE with LightFab 3D Printer", URL: www.lightfab.de, Datasheet | LightFab, 2015, 2 pages.
"Selective Laser Etching of Glass and Sapphire", URL: www.ilt.fraunhofer.de, Fraunhofer Institute for Laser Technology ILT, 2020, 2 pages.

* cited by examiner

SELECTIVE LASER ETCHING OF LAYERED FLUIDISTORS

CROSS-REFERENCE TO RELATED APPLICATION

This application claims the benefit of priority under 35 U.S.C. § 119(e) of U.S. Provisional Application No. 63/041,256, filed Jun. 19, 2020, the contents of which are incorporated herein by reference in their entirety.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
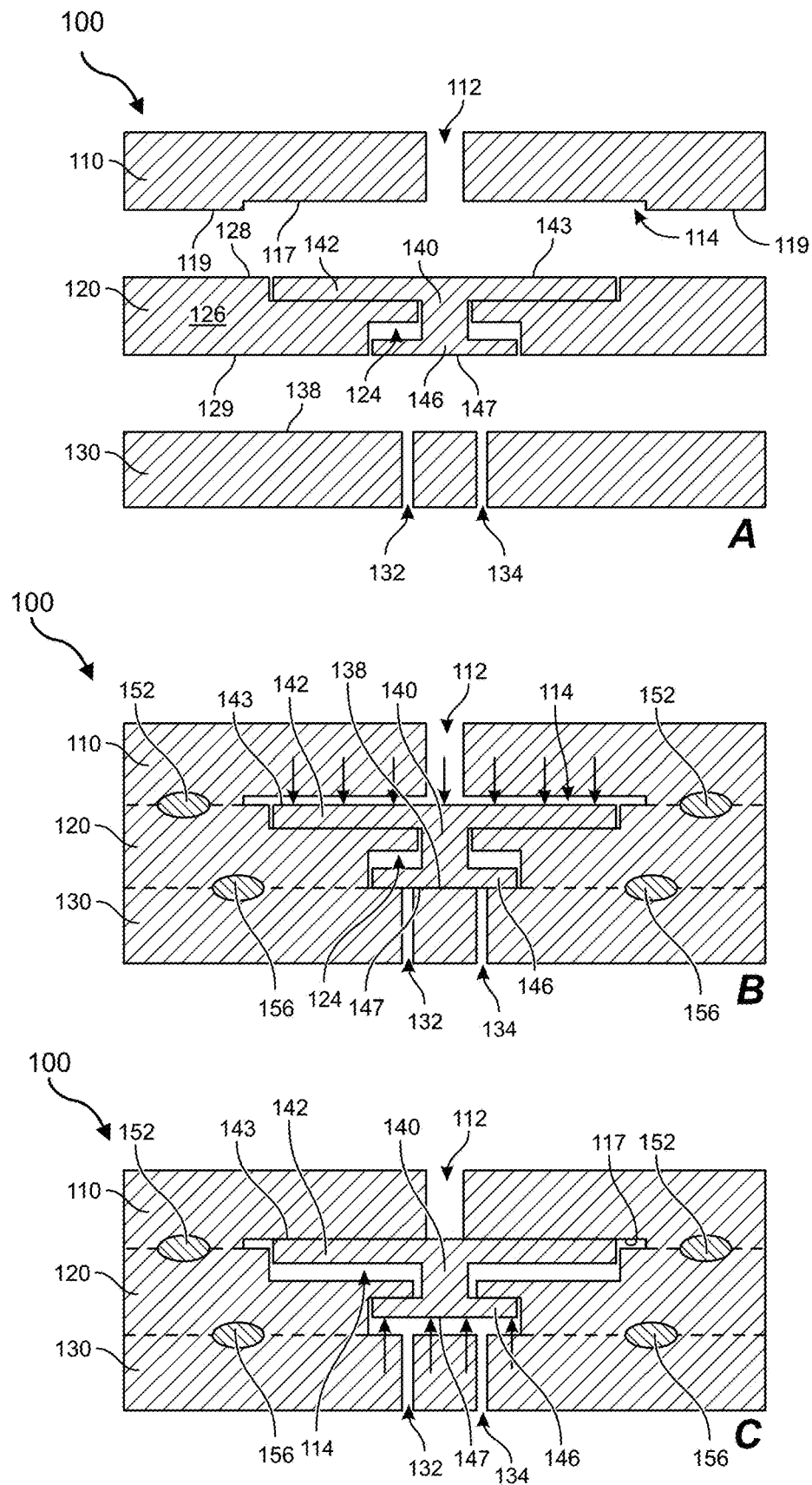
FIG. 1 is a schematic illustration of an example method of forming a multilayer fluidic device according to some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure relates generally to fluidistors (i.e., fluidic transistors) and other fluidic devices, and more particularly to fluidistor structures such as fluidic valves and their methods of manufacture. A fluidic device may provide a fluidic output, which may include an output pressure and/or an output flow rate that may depend on a fluidic input, such as an input pressure and/or an input flow rate.

A fluidic device generally includes a channel having an input (e.g., a source) and an output (e.g., a drain). The channel directs a fluid (e.g., liquid or gas) from the input to the output. The fluidic device also includes a gate that affects the flow of fluid in the channel. For instance, in some embodiments, once a threshold gate pressure is achieved, the gate may move to restrict the fluid flow in the channel. In alternate embodiments, the flow in the channel may be restricted until a threshold pressure at the gate is achieved. Various embodiments of the present disclosure relate to fluidic devices, systems, and methods that involve the control (e.g., starting, stopping, increasing, decreasing, etc.) of fluid flow through a channel.

In accordance with various embodiments, fluidic devices, including fluidic valve analogs to p-type field effect transistor (pFET), n-type field effect transistor (nFET), and complementary field effect transistor (cFET) solid state devices, may include an assembly of generally rigid materials that collectively define the inputs, channels, gates, outputs, etc. A pFET device may be a normally open device, an nFET device may be a normally closed device, and a cFET device may combine the functionality of a pFET device and an nFET device into a single package. In example embodiments, a fluidic device exhibiting pFET, nFET, cFET, or other functionalities may be formed by patterning and etching fluidic device structures into two or more rigid substrates and then stacking, aligning, and bonding the substrates.

Example rigid materials include optically transparent glass compositions, such as fused silica, soda-lime glasses, aluminosilicate glasses, borosilicate glasses, and the like, that may be chemically etched to form a fluidic device architecture therein. According to various embodiments, "transparent" or "optically transparent" compositions may, in certain examples, have a transmissivity within a selected range of the electromagnetic spectrum of at least approximately 80%, e.g., approximately 80%, approximately 90%, approximately 92%, approximately 94%, approximately 96%, approximately 98%, approximately 99%, approximately 99.5%, or approximately 99.9% transmissivity, including ranges between any of the foregoing values, and less than approximately 10% bulk haze, e.g., approximately 0%, approximately 1%, approximately 2%, approximately 4%, approximately 6%, or approximately 8% bulk haze, including ranges between any of the foregoing values.

In some examples, fluidic devices may be fabricated entirely from such rigid, transparent materials. Whereas comparative fluidic valves typically include one or more resilient and/or compliant components, such as a rubber membrane, a polytetrafluoroethylene gasket, or a similar element that is configured to provide a fluid seal between respective surfaces of adjacent structures or elements, in some examples described herein a suitable seal may be formed between complementary and conforming rigid surfaces, for example, between two planar glass surfaces, without using a non-rigid component, thus simplifying manufacture and avoiding complications ubiquitous with the aging, deterioration, and wear of most compliant materials.

In some examples, a fluidic valve may include a rigid body and a rigid gate transmission element disposed within the rigid body. Fluid flow through the fluidic valve may be restricted or prevented by providing contact between rigid surfaces. In some examples, fluidic devices may include a fluidic valve in which a fluid seal is provided by urging a rigid exterior surface of a gate transmission element against a rigid interior surface of a chamber formed in the rigid body, for example, using a fluid pressure received from a gate.

In some embodiments, a fluidic device may include a body formed from a rigid body material, the body having a chamber. The device may include a fluidic source, a fluidic drain, and a fluidic gate, which may have respective fluid connections with the chamber. An example device may include a gate transmission element located within the chamber, where a position of the gate transmission element may be controllable between a first position and a second position using a gate pressure received through the fluidic gate.

In some examples, a gate transmission element may be referred to as a "valve." A gate transmission element may include a piston or other mechanical component having a gate surface that receives the gate pressure over a given area. In some examples, the resultant force on the gate transmission element may act to close a fluidic valve. In some examples, the resultant force on the gate transmission element may act to open a fluidic valve.

In some examples, a fluidic valve may be normally open, where a gate force may be used to close the fluidic valve. In some examples, a fluidic valve may be normally closed, where a gate force may be used to open the fluidic valve. A gate force may result from pressure applied to a gate pressure receiving surface of a gate portion of a gate transmission element.

In some examples, the gate transmission element may be dimensioned to allow fluid to flow between the fluidic source and the fluidic drain when in the first position, and the gate transmission element may be dimensioned to reduce or substantially prevent fluid from flowing between the fluidic source and the fluidic drain when in the second position. In some examples, the output pressure at the fluidic output may be controlled based on the position of the gate transmission element.

As used herein, the term "substantially" in reference to a given parameter, property, or condition may mean and include to a degree that one of ordinary skill in the art would understand that the given parameter, property, or condition is met with a small degree of variance, such as within acceptable manufacturing tolerances. By way of example, depending on the particular parameter, property, or condition that is substantially met, the parameter, property, or condition may be at least 90% met, at least 95% met, or even at least 99% met.

The gate transmission element may include a gate portion having a gate pressure receiving surface, and a closure portion having a closure surface. The gate portion and the closure portion may constitute a unitary part or two or more aggregate parts that are mechanically interconnected. During operation, the closure surface may be urged against an internal surface of the chamber by a gate pressure received through the fluidic gate by the gate pressure receiving surface such that the gate transmission element is in the second (closed) position and the gate transmission element blocks a fluid path between the fluidic source and the fluidic drain.

The closure surface and a portion of the internal surface of the chamber may be conformal, and in some examples, both may be planar. By removing the gate pressure applied to the gate pressure receiving surface, the closure surface may move away from the internal surface as the gate transmission element moves from the second position to the first (open) position. That is, the gate transmission element may be configured to allow a fluid path between the fluidic source and the fluidic drain, for example, by decreasing the gate pressure.

According to various embodiments, a subtractive manufacturing process such as a selective laser-induced etching technique may be used to form one or more components (e.g., input flow path(s), channel(s), chamber(s), gate transmission element(s), output flow path(s), etc.) of a fluidic device. In particular embodiments, the various components may be independently formed in two or more transparent glass substrates that are subsequently aligned and bonded together. That is, a fluidic device such as a fluidic valve may include a layered assembly of separately prepared glass substrates where each component or portion thereof is formed in a corresponding glass substrate by selective laser-induced etching.

Selective laser-induced etching (SLE) is a hybrid, direct write process that may be used to fabricate 3D structures within solid, optically transparent materials. In a first step, according to some embodiments, a desired pattern is introduced to a transparent substrate by locally exposing the substrate to laser radiation. The focal point of the laser may be scanned throughout the substrate to create a 3D connected volume of modified material having contact with a surface of the substrate at one or more locations. Essentially no material is removed during the laser treatment; however, the laser irradiation may modify the substrate chemistry leaving the exposed regions susceptible to chemical etching (i.e., relative to unexposed regions).

In certain embodiments, short pulse widths and a small laser focal volume during laser exposure may be used to decrease the propensity for damage to the substrate, avoiding the formation of stress-induced cracks, for example. In certain embodiments, the laser irradiation may include femtosecond to picosecond pulses and a spot size of less than approximately 10 $\mu m^3$. In certain embodiments, the thickness of a transparent substrate may range from approximately 1 mm to approximately 15 mm, although the substrate dimensions are not particularly limited.

The laser may be chosen from any suitable laser known in the art. For example, the laser may emit light at UV (~350-400 nm), visible (~400-700 nm), or IR (~750-1400 nm) wavelengths. In certain embodiments, a high-repetition pulsed UV laser operating at approximately 355 nm, or any other suitable UV wavelength, may be used. In other embodiments, a continuous wave laser operating at approximately 532 nm, or any other suitable visible wavelength, may be used. In further embodiments, a near-infrared laser operating at approximately 810 nm, or any other suitable IR wavelength, may be used. According to various embodiments, the laser may operate at a predetermined wavelength ranging from approximately 300 nm to approximately 1600 nm.

In a second step, the modified volume of material may be selectively removed by wet chemical etching to produce the 3D pattern. An example wet etch chemistry may include a solution of potassium hydroxide (KOH) or hydrofluoric acid (HF), although further etch chemistries may be used. In some embodiments, relative to the unexposed material, the etch rate selectivity of the modified material may be at least approximately 100:1, e.g., approximately 100:1, approximately 200:1, approximately 500:1, or greater, including ranges between any of the foregoing values.

Selective laser-induced etching may be used to form features having a wide range of shapes and dimensions. For instance, selective laser-induced etching may be used to form both linear and non-linear channels within a solid, e.g., glass, matrix. In addition to the formation of chambers and channels, SLE may be used to form dynamic structures. For example, a slidable gate transmission element may be formed within a rigid body by etching a 3D skirt around a desired structure.

A gate transmission element may be fabricated in situ within a chamber formed within a device body. The chamber may be formed as the body is etched, and, concurrently, the gate transmission element may be formed within the chamber as the chamber is formed. According to some embodiments, substrate etching to form a gate transmission element may avoid etching of the closure surface. In some examples, after the SLE fabrication process is complete, the gate transmission element may not be removable from the chamber, for example, without damaging the body. According to some embodiments, a gate transmission element may include a flange that allows slidable motion of the gate transmission element while preventing the gate transmission element from being removed from the substrate.

Advantageously, SLE may be used to form features both internal to and at a surface of a solid substrate with a high degree of precision. The layer-by-layer SLE-based manufacturing method disclosed herein may allow improved control of the dimensional accuracy and precision of the etched structures while avoiding the need to pick and place individual components to assemble a fluidic device.

Following SLE processing, a laser-induced glass welding technique may be used to bond adjacent glass substrates and hermetically seal a fluidic device. After performing SLE processing (e.g., on first and second glass substrates), an example bonding method may include aligning and bringing the first and second glass substrates into contact to form a substrate interface, and directing a laser beam operating at a predetermined wavelength through the second substrate proximate to the substrate interface, where the first substrate absorbs light from the laser beam in an amount sufficient to form a weld between the first substrate and the second substrate.

The first substrate may, in various embodiments, be the sealing substrate, e.g., the substrate configured to absorb light from the laser beam so as to form a weld or seal between the first and second substrates. In certain embodiments, the first substrate may be heated by light absorption from the laser beam and may, in conjunction with a local decrease in viscosity, locally expand to form the weld/hermetic seal. Accordingly, the first substrate may have an absorption at the operating wavelength of the laser of at least approximately 10 $cm^{-1}$, for example, at least approximately 20 $cm^{-1}$, or at least approximately 50 $cm^{-1}$. In this regard, to achieve high absorption levels, the first substrate may be doped with an absorbing species, such as a transition metal or rare earth metal ion.

According to certain embodiments, the first substrate may include at least one transition metal oxide dopant or rare earth oxide dopant. For example, the first substrate may include at least one oxide chosen from vanadium, chromium, manganese, iron, cobalt, nickel, copper, yttrium, and lanthanum oxides. The amount of transition metal or rare earth oxide may vary depending on the desired absorption properties of the first substrate, but may range, for example, from approximately 0.05 mol % to approximately 10 mol %, such as approximately 0.05 mol %, approximately 0.1 mol %, approximately 0.2 mol %, approximately 0.5 mol %, approximately 1 mol %, approximately 2 mol %, approximately 5 mol %, or approximately 10 mol %, including ranges between any of the foregoing values.

The second substrate may be compositionally similar to or distinct from the first substrate, except that the second substrate may be configured to not appreciably absorb light from the laser beam. The second substrate may, in some embodiments, have an absorption of less than approximately 1 $cm^{-1}$ at the operating wavelength of the laser, for example, less than approximately 1 $cm^{-1}$, less than approximately 0.5 $cm^{-1}$, less than approximately 0.2 $cm^{-1}$, or less than approximately 0.1 $cm^{-1}$. Accordingly, the second substrate may be undoped, substantially undoped, or doped with a light absorbing species to a lesser extent than the first substrate.

In accordance with various methods, following SLE processing, the first and second substrates may be brought into contact to form a substrate interface and define at least a portion of a fluidic device. The substrate interface, as referred to herein, includes the points of contact between the surfaces of the first and second substrates, which may include the surfaces to be welded.

According to some embodiments, wet etching of the surfaces to be joined may be avoided during SLE processing. As will be appreciated, etching may induce surface roughness that may challenge the formation of a hermetic seal between glass substrates. In certain embodiments, pristine surfaces of a glass substrate may have an average surface roughness of less than approximately 1 nm, whereas an average surface roughness of glass that has been etched in a selective laser-induced etching process may have an average surface roughness of approximately 200 nm or greater.

The substrates may be brought into contact by any manner known in the art and may, in certain embodiments, be brought into contact using force, e.g., an applied compressive force. By way of another non-limiting example, the substrates may be arranged proximate to one another and vacuum may be applied at the interface so as to draw the substrates into intimate contact. For instance, the first substrate may include one or more apertures that extend to the bonding surface of the first substrate through which vacuum may be applied prior to and/or during the act of welding. In certain embodiments, vacuum, clamps, brackets, and/or other fixtures may be used to apply a compressive force so as to ensure contact at the substrate interface during the act of welding.

According to various embodiments, the laser beam may be incident upon and directed through the second substrate and into the first substrate proximate to the substrate interface, where the first substrate absorbs a sufficient amount of light to create a weld between the substrates. The focal point of the laser may be offset from the substrate interface by a distance of up to approximately 100 micrometers, e.g., approximately 20 micrometers, approximately 50 micrometers, or approximately 100 micrometers, including ranges between any of the foregoing values.

In certain embodiments, the laser may operate at an average power greater than approximately 2 W, e.g., approximately 2 W, approximately 4 W, approximately 6 W, approximately 8 W, approximately 10 W, or approximately 12 W, including ranges between any of the foregoing values. As will be appreciated, the laser power used to form a weld between adjacent substrates may be greater than the laser power used in conjunction with SLE processing.

During the independent acts of SLE processing and welding, the laser may operate at any suitable frequency and may, in certain embodiments, operate in a quasi-continuous or continuous mode. In further embodiments, the laser may operate in a surge mode having a plurality of pulses with a duty cycle ranging from approximately 10% to approximately 90%. The duration or pulse width of the pulse may vary, for example, such that the duration may be less than approximately 1 ps in certain embodiments. In other embodiments, the pulse width or duration may range from approximately 1 fs to approximately 1 ps.

During welding, the beam may be directed at and focused proximate to the substrate interface such that the beam spot diameter near the interface may be less than approximately 100 micrometers, e.g., approximately 10 micrometers, approximately 20 micrometers, approximately 50 micrometers, or approximately 100 micrometers, including ranges between any of the foregoing values. The laser beam may be scanned or translated along the substrates in any pattern or predetermined path to hermetically seal one or more fluidic devices positioned within and between the substrates.

Reference herein to "hermetic" or a "hermetic seal" and the like may, in various examples, refer to a barrier or interface that is substantially airtight and substantially impervious to moisture. According to certain embodiments, a hermetic seal may be configured to limit the transpiration (diffusion) of oxygen or other gas to less than approximately $10^{-2}$ cm$^3$/m$^2$/day (e.g., less than approximately $10^{-3}$ cm$^3$/m$^2$/day) and limit the transpiration (diffusion) of water to less than approximately $10^{-2}$ g/m$^2$/day (e.g., less than approximately $10^{-3}$, $10^{-4}$, $10^{-5}$ or $10^{-6}$ g/m$^2$/day, including ranges between any of the foregoing values).

According to further embodiments, an O-ring seal may be substituted for a laser weld. In such embodiments, SLE processing may be used to form a groove or a pair of mating grooves along the interface to be sealed. In lieu of a weld line, an O-ring may be fitted into the groove(s) prior to joining the substrates.

Fluidic devices may be, or include, a fluidic valve, which may receive an input signal including one or more of pressure, flow rate, or mechanical displacement, and generate an output signal of pressure, flow rate, and/or mechanical displacement that may be correlated to the input signal. In some examples, this correlation may be achieved using partial actuation of one or more relative area valves, and optionally may be combined with the implementation of pressure-based feedback. A fluidic valve may provide fluidic pressure gain and/or flow gain. However, examples disclosed herein are not limited to devices having a gain of pressure and/or flow.

In some examples, a fluidic circuit may include a relative area fluidic valve with the gate transmission element region pressurized. This configuration may allow for pressurization of the region between the gate and the valve seat. Control of this pressure may enable control of the actuation pressure of normally-closed valves and may also enable use of normally-closed valves as normally-open valves. In some examples, a relative area fluidic valve may include innate fluidic feedback and/or may include a high impedance to increase pressure and/or provide flow amplification.

In some examples, a device may include a complementary relative area valve circuit, which may include feedback. Feedback may be configured as inverting or non-inverting.

In some examples, chained complementary valves may be configured as inverting or non-inverting. In examples with an inverting chain of fluidic valve stages, the stage outputs may alternate between high and low at the output of each stage. In a non-inverting chain of fluidic valves, the output may be the same (high or low) at the output of each stage. In some examples, a complementary relative area valve may be configured as a differential amplifier. Additionally or alternatively, a complementary relative area valve may be configured as a current mirror. In some examples, a complementary relative area valve may be configured as a positive feedback device and may be used as a pseudo latch.

In some examples, a fluidic valve may be used in an analog fluidic circuit, which may be used for variable-stiffness jamming, user force-dependent grounding, fine control of soft robots, and the like. Example applications include fluidic amplifiers having improved or controlled frequency response and feedback controls, devices providing a conversion of displacement to pressure, devices providing a conversion of pressure to fluid flow, microfluidic devices, etc.

Analog fluidic circuits may convert small changes in input pressure and/or input flow into proportional (or semi-proportional) changes in output pressure and/or output flow. Fluidic amplification may include fluidic gain in pressure and/or flow, allowing increased output pressure and/or output current changes as a result of input pressure and/or input current changes.

In some examples, a fluidic actuator may affect an all-or-nothing change to a fluidic signal, which may be termed a binary or digital actuator. Semi-continuous signals may be generated by multiple binary actuators working in parallel, which may involve using a corresponding number of independent controls. Continuous pressure may also be generated through an independent pressure controller.

In some examples, a fluidic circuit, such as an analog fluidic amplifier, may include only a single fluidic valve. In some examples, a fluidic circuit may include a plurality of fluidic valves. Example fluidic circuits may include a differential pair of fluidic valves where one output flow (and/or output pressure) increases as the other output flow (and/or output pressure) decreases. In some examples, a device, such as a fluidic amplifier, may include a pair of fluidic valves configured as a fluidic differential amplifier. A fluidic differential amplifier may be configured with or without output flow buffering. In some examples, a buffered amplifier may be used for signal isolation. In some examples, a fluidic circuit may include a current mirror in which a fluidic flow rate is reproduced in one or more additional fluidic channels. Example fluidic amplifiers may have different amplifier structures, such as common gain architectures or common gate architectures.

In some examples, a fluidic oscillator may include one or more fluidic valves configured as an amplifier with positive feedback. In some examples, a device may include a fluidic ring oscillator with frequency control. The frequency control may include an adjustable output flow restrictor. An adjustable flow restrictor may include an adjustable aperture (such as an adjustable area aperture or an aperture selectable from a plurality of apertures having different aperture areas).

Many functions described herein may be achieved with different circuit topologies or a different design of the fluidic valve(s). Example fluidic valves may include, for example, normally open, normally closed, and complementary relative area fluidic valves. Furthermore, in conjunction with the various fluidic devices disclosed herein, suitable fluids may include compressible fluids or incompressible fluids. In some examples, a fluid may be a liquid or a gas.

Fluidic devices may be incorporated into haptic devices, for example, to provide tactile feedback to a user in an augmented reality (AR) or virtual reality (VR) system. For instance, in some examples, the output of a fluidic device may be connected to a haptic device. In some examples, methods of providing haptic feedback include using a fluidic device to provide a time-varying pressure signal to the skin of a user. Haptic feedback may include an oscillatory or other time-dependent pressure signal, which may in some examples be conveyed to a user by inflation of an enclosure (such as a bladder) or a channel (such as an elastic-walled channel) located proximate to the user's skin.

Further example applications for fluidic devices include hydraulic systems, devices, and methods, such as suspensions (e.g., for vehicles, robots, or any mobile object), transmissions (e.g., for engines, pumps, and the like), and hydraulic actuators (including pushers, drills, and other rotating items). Further examples include systems, devices, and methods related to general pneumatic control and pneumatic logic applications, including fluidic logic devices. In some examples, devices and systems may be configured as fluidic control devices or systems for chemical engineering processing or other applications. Example devices may be configured to control the fluid flow of one or more chemical species, reagents, solvents, etc. Examples include large-scale industrial control, and smaller scale applications including microfluidics. Additional examples include devices for inflating one or more pneumatic devices, which may include large devices such as balloons or bladders. Fluidic logic may be used to control haptic systems.

According to further embodiments, fluidic devices may be incorporated into robotic devices and components, including soft robotic devices, such as grasping arms and manipulator arms. Examples also include control of microfluidic devices for chemical, biological, and biomedical applications, such as bioassays, cell sorting, and the like. In some examples, a fluidic device may be used for pneumatic control of a microfluidics device. Examples also include computational fluidics, including fluidic logic gates and fluidic operational amplifiers.

Computational fluidic devices may be used in conditions hostile to conventional electronic components, such as in the presence of ionizing radiation and/or high temperatures. Fluidic valve components and fluids used in a fluidic circuit may have an operational temperature range appropriate to the application and/or operational conditions, which may include temperatures well above or well below typical room temperatures.

In accordance with various embodiments, a "fluid" may include organic and inorganic compounds, solvents, molten salts, etc. Glycols, alcohols, and the like, may be included in a fluid, in whole or in part, for low temperature applications. Inorganic compounds such as molten salts or molten metals may be used as the fluid in high temperature applications (e.g., for rocketry, nuclear reactor control, space applications, and the like).

In some examples, a fluid may be (or include) an aqueous fluid (such as water, a salt solution, etc.). In some examples, a fluid may be (or include) an oil, such as a hydrocarbon. In some examples, a fluid may be a multiple phase mixture. In some embodiments, a fluid may be (or include) a non-Newtonian fluid, such as a liquid crystal, thixotropic liquid, emulsion, micellar solution, and the like. In some examples, a gas (such as air or nitrogen) may be used instead of a liquid fluid. In some examples, a fluidic input may include a pressure and/or flow of a gas (such as air, nitrogen, steam, or other gas or vapor). In some examples, a fluidic output may include a pressure and/or flow of a gas (such as air, nitrogen, steam, or other gas or vapor).

In accordance with various embodiments, a fluidic device or a fluidic valve may be constructed by direct etching of glass. Moreover, fluid channels and movable components for such a device or valve may be formed by etching system components in situ. In some examples, a fluidic device or valve may be assembled from individual components. In some examples, a fluidic device or valve may have a multilayer structure.

The following will provide, with reference to FIGS. 1-13, detailed descriptions of layered fluidistor structures, their methods of manufacture, and devices that include such structures. The discussion associated with FIGS. 1-7 includes a description of fluidic devices including fluidic valves. The discussion associated with FIGS. 8-13 relates to exemplary virtual reality and augmented reality devices that may include a layered fluidistor as disclosed herein.

Using selective laser-induced etching, separate glass substrates may be processed independently to form therein elements of a fluidic device, including source, drain, and gate channels, a chamber, and a gate transmission element located within the chamber with suitable headspace to allow translational motion of the gate transmission element within an assembled device. The etched substrates may be stacked, aligned, and bonded to form a fluidic valve, for example. In accordance with some embodiments, a method for manufacturing a multilayer fluidistor 100 is described with reference to FIG. 1.

Referring to FIG. 1A, following SLE processing, first glass substrate 110 may include a fluidic gate 112 extending through the substrate to an upper chamber portion 114. Adjacent (i.e., peripheral) to upper chamber portion 114, a polished, unetched bonding surface 119 may be configured to be joined (e.g., laser welded) to the bonding surface of an adjacent glass substrate, such as a second glass substrate.

Second glass substrate 120 may include a gate transmission element 140 within lower chamber portion 124 of a body 126. Gate transmission element 140 may be a unitary part and may include a gate portion 142 having a gate pressure receiving surface 143 and a closure portion 146 mechanically coupled to the gate portion 142 and having a closure surface 147. The gate transmission element 140 may be sized to allow a fluid flow path around the gate transmission element, i.e., between the gate transmission element 140 and second glass substrate 120, to provide a suitable pressure drop between the gate 112 and the source 132 and/or drain 134.

In some examples, fluid received by the fluidic gate 112 (i.e., gate fluid) may leak around the gate transmission element 140, even when the closure surface 147 is in contact with an internal surface of the chamber. That is, a device may be configured to provide a passive leakage of gate fluid around the gate transmission element. The attendant pressure drop may be useful during the transition between states to avoid the equalization of pressure on two sides of the gate transmission element 140, which may prevent unintended motion thereof.

The gate pressure receiving surface 143 and the closure surface 147 may both include pristine, polished glass that is unetched by the SLE process. Also, second glass substrate 120 may include a planar upper bonding surface 128 and a planar lower bonding surface 129. Bonding surfaces 128, 129 may each include pristine, polished glass that is unetched by the SLE process. Portions of upper bonding surface 128 may be configured to be joined to bonding surface 119 of first glass substrate 110. Lower bonding surface 129 may be configured to be joined (e.g., laser welded) to the bonding surface of an adjacent glass substrate, such as a third glass substrate.

Third glass substrate 130 may include a fluidic source 132 and a fluidic drain 134 that may each extend through the substrate, and a pristine, polished (i.e., unetched) upper bonding surface 138. Portions of upper bonding surface 138 may be configured to be joined (e.g., laser welded) to the lower bonding surface 129 of second glass substrate 120. Fluidic source 132 is adapted to receive fluid, which may be conveyed to lower chamber portion 124. Fluidic drain 134 is adapted to convey fluid away from lower chamber portion 124.

Referring to FIG. 1B, illustrated is an assembled multilayer fluidistor 100 according to various embodiments. Multilayer fluidistor 100 has a stacked and bonded architecture that includes first, second, and third glass substrates 110, 120, 130. Between first glass substrate 110 and second glass substrate 120, a weld line 152 extends at least partially around (e.g., completely around) chamber portions 114, 124. Between second glass substrate 120 and third glass substrate 130, a further weld line 156 extends at least partially around (e.g., completely around) chamber portions 114, 124. During various modes of operation, gate 112, source 132, and drain 134 may independently be in fluid communication with one or both of chamber portions 114, 124.

During one mode of operation, as shown in FIG. 1B, gate transmission element 140 may be urged downward by a gate pressure exerted through fluidic gate 112 against gate pressure receiving surface 143, so that closure surface 147 contacts upper bonding surface 138. This contact closes the fluid connection between the fluidic source 132 and the fluidic drain 134. In the example embodiment, upper bonding surface 138 and closure surface 147 may include conformal, planar surfaces.

As shown in FIG. 1B, areal dimensions of gate portion 142 may be less than areal dimensions of the upper chamber portion 114 such that decreasing or reversing the gate pressure allows a source pressure acting on the underside of closure portion 146 to urge the gate transmission element 140 upwards, opening the valve between the source and the drain. Referring to FIG. 1C, in the open state, gate pressure receiving surface 143 may contact a sealing surface 117 of first glass substrate 110. In the illustrated embodiment, sealing surface 117 and gate pressure receiving surface 143 may include conformal, planar surfaces. This contact stops the flow of fluid from gate 112 into upper chamber portion 114 and opens the fluid connection between the fluidic source 132 and the fluidic drain 134.

Figure 2:
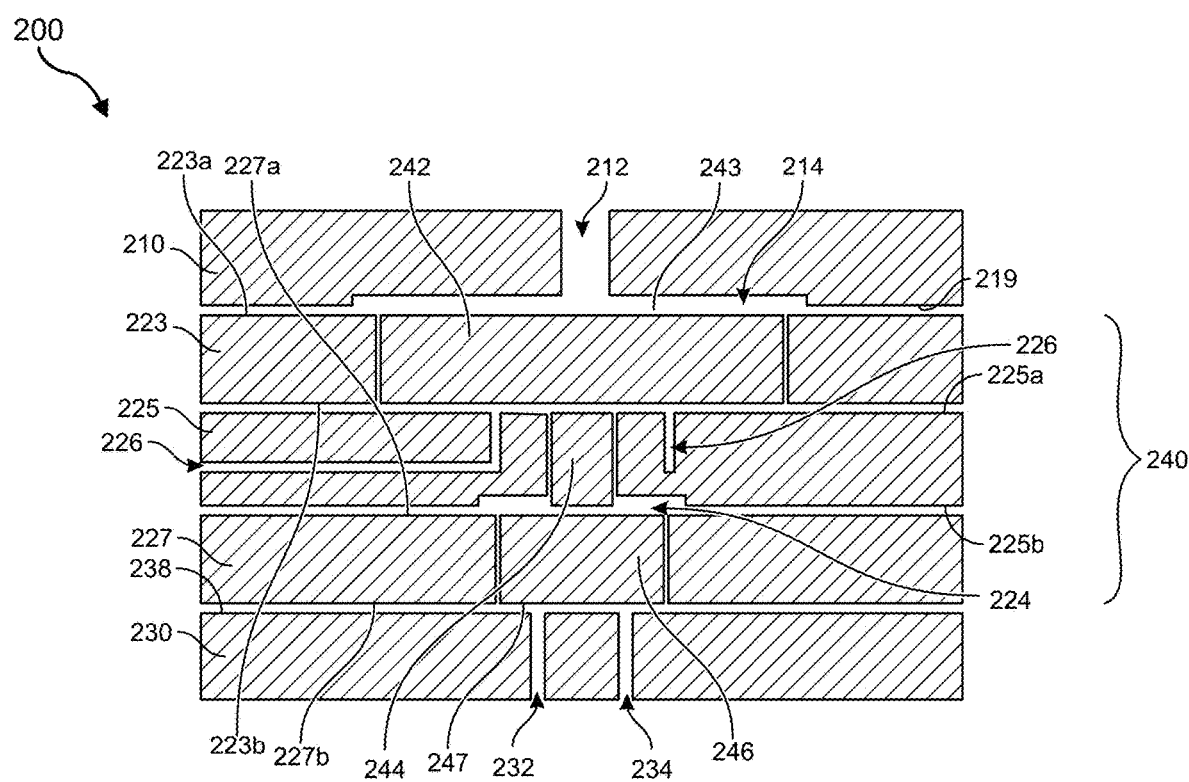
FIG. 2 is a schematic illustration of an example method of forming a multilayer fluidic device according to further embodiments.

Although multilayer fluidistor 100 includes three integrated glass substrates, it will be appreciated that SLE processing may be used to form a multilayer device having four or more substrates. Turning to FIG. 2, for example, shown is an exploded cross-sectional view of a multilayer fluidistor that includes five substrates. In the multilayer fluidistor of FIG. 2, in contrast to multilayer fluidistor 100, the structure of the gate transmission element is partitioned over multiple substrates, which may afford better dimensional control, including improved precision and accuracy throughout laser irradiation and wet etching. Such an approach may also facilitate a modular construction of the gate transmission element.

Referring still to FIG. 2, multilayer fluidistor 200 includes, from top to bottom, a first substrate 210, a second substrate 223, a third substrate 225, a fourth substrate 227, and a fifth substrate 230. The substrates 210, 223, 225, 227, and 230 may include transparent glass substrates.

Following SLE processing, first glass substrate 210 may include a fluidic gate 212 that extends through the substrate to an upper chamber portion 214. Adjacent to upper chamber portion 214, a polished, unetched bonding surface 219 may be configured to be joined (e.g., laser welded) to the bonding surface of an adjacent glass substrate, such as second glass substrate 223.

Second glass substrate 223 may include the gate portion 242 of a gate transmission element 240. Gate portion 242 may extend completely through the body of the second glass substrate 223 and may include a gate pressure receiving surface 243 proximate to upper chamber portion 214. Gate pressure receiving surface 243 may include pristine, polished glass that is unetched by the SLE process. Located peripheral to gate portion 242, second glass substrate 223 may include an upper bonding surface 223a and a lower bonding surface 223b. Upper bonding surface 223a and lower bonding surface 223b may each include pristine, polished glass that is unetched by the SLE process. Portions of upper bonding surface 223a may be configured to be joined to bonding surface 219 of first glass substrate 210. Lower bonding surface 223b may be configured to be joined (e.g., laser welded) to the bonding surface of an adjacent glass substrate, such as third glass substrate 225.

Third glass substrate 225 is positioned beneath the second glass substrate 223 and includes a lower chamber portion 224, a vent 226, and a connecting portion 244 of gate transmission element 240 located within lower chamber portion 224. In an assembled state, an upper surface of connecting portion 244 is configured to be in direct contact with a lower surface of the gate portion 242.

Third glass substrate 225 may include an upper bonding surface 225a and a lower bonding surface 225b each peripheral to connecting portion 244. Upper bonding surface 225a and lower bonding surface 225b may each include pristine, polished glass that is unetched by the SLE process. Portions of upper bonding surface 225a may be configured to be joined to portions of lower bonding surface 223b of second glass substrate 223. Lower bonding surface 225b may be configured to be joined (e.g., laser welded) to the bonding surface of an adjacent glass substrate, such as fourth glass substrate 227.

Fourth glass substrate 227 is located beneath third glass substrate 225. Fourth glass substrate 227 includes a closure portion 246 of gate transmission element 240, which may extend completely through the body of the fourth glass substrate 227. Closure portion 246 may include a closure surface 247 proximate to an adjacent substrate. Closure surface 247 may include pristine, polished glass that is unetched by the SLE process. In an assembled state, an upper surface of the closure portion 246 may be in direct contact with a lower surface of connecting portion 244.

Fourth glass substrate 227 may include an upper bonding surface 227a and a lower bonding surface 227b peripheral to closure portion 246. Upper bonding surface 227a and lower bonding surface 227b may each include pristine, polished glass that is unetched by the SLE process. Portions of upper bonding surface 227a may be configured to be joined to portions of lower bonding surface 225b of third glass substrate 225. Lower bonding surface 227b may be configured to be joined (e.g., laser welded) to the bonding surface of an adjacent glass substrate, such as fifth glass substrate 230.

Fifth glass substrate 230 may include a fluidic source 232 and a fluidic drain 234 that extend through the substrate, and a pristine, polished (i.e., unetched) upper bonding surface 238. Portions of upper bonding surface 238 may be configured to be joined (e.g., laser welded) to portions of the lower bonding surface 227b of fourth glass substrate 227. Fluidic source 232 is adapted to receive fluid, which may be conveyed to lower chamber portion 224. Fluidic drain 234 is adapted to convey fluid away from lower chamber portion 224.

In the embodiment of FIG. 2, gate transmission element 240 is a segmented part that includes gate portion 242, connecting portion 244, and closure portion 246, each respectively formed within second glass substrate 223, third glass substrate 225, and fourth glass substrate 227. Gate transmission element 240 may be sized to allow fluid flow around the gate transmission element, i.e., between the gate transmission element 240 and substrates 223, 225, 227 to provide a suitable pressure drop between the gate 212 and the source 232 and/or drain 234. As will be appreciated, upper and lower chamber portions 214, 224 may provide suitable headspace to allow translational motion of gate transmission element 240 between first (open) and second (closed) positions.

A gate transmission element, such as gate transmission element 140 or gate transmission element 240, may have any suitable shape and dimensions. For instance, gate portion 242, connecting portion 244, and closure portion 246 may include stacked cylindrical prisms, although the cross sectional shape is not particularly limited. In one example, a diameter (d1) of gate portion 242 may range from approximately 1 mm to approximately 20 mm, e.g., approximately 1 mm, approximately 2 mm, approximately 5 mm, approximately 10 mm, or approximately 20 mm, including ranges between any of the foregoing values, a diameter (d2) of connecting portion 244 may range from approximately 0.2 mm to approximately 2 mm, e.g., approximately 0.2 mm, approximately 0.5 mm, approximately 1 mm, or approximately 2 mm, including ranges between any of the foregoing values, and a diameter (d3) of closure portion 246 may range from approximately 0.5 mm to approximately 10 mm, e.g., approximately 0.5 mm, approximately 1 mm, approximately 2 mm, approximately 5 mm, or approximately 10 mm, including ranges between any of the foregoing values, although lesser and greater dimensions are contemplated. In a particular example, a diameter (d1) of gate portion 242 may range from approximately 1 mm to approximately 1.5 mm, a diameter (d2) of connecting portion 244 may range from approximately 0.2 mm to approximately 0.5 mm, and a diameter (d3) of closure portion 246 may range from approximately 0.5 mm to approximately 1 mm.

Figure 3:
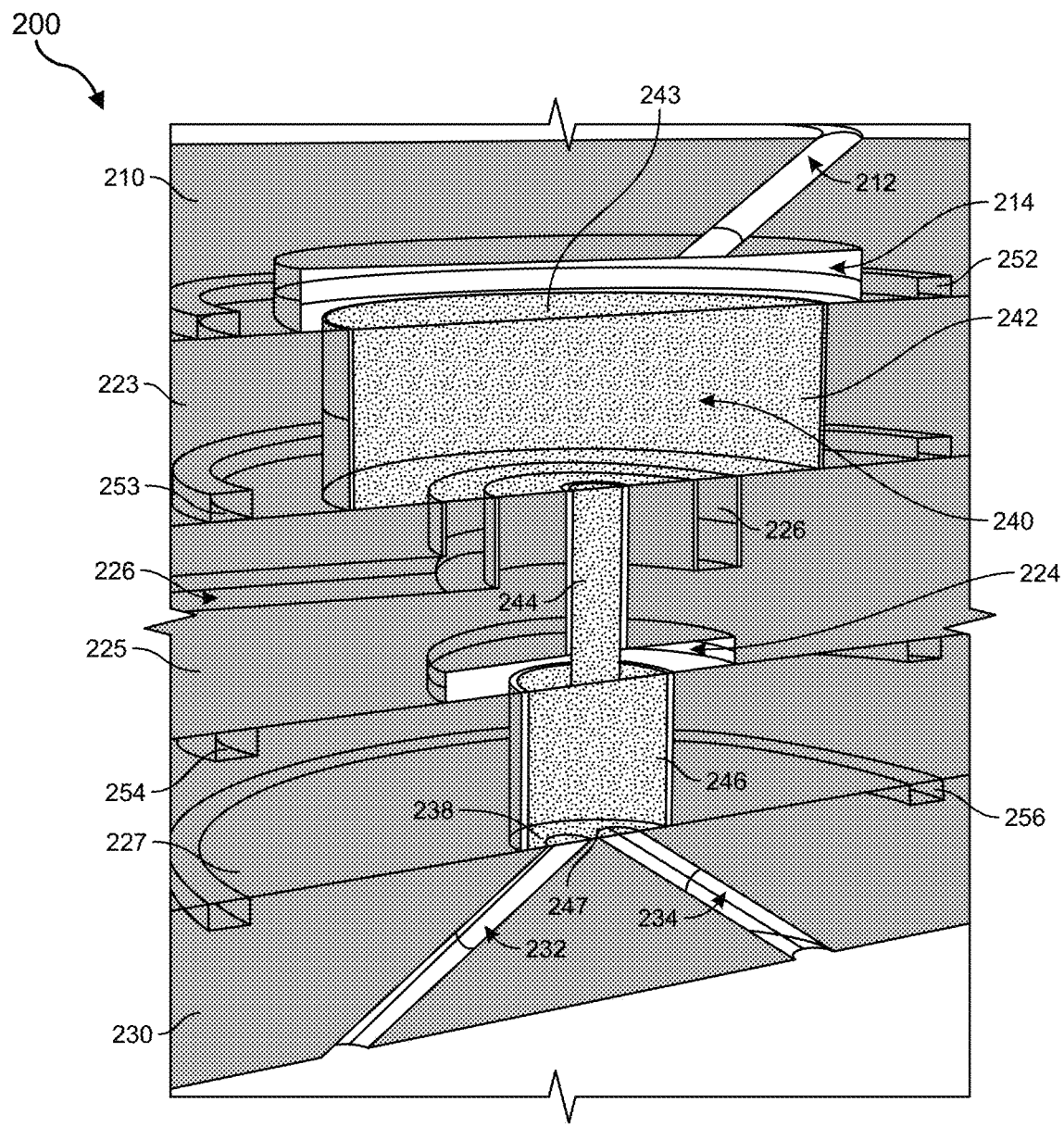
FIG. 3 is a perspective view of an assembled multilayer fluidic device according to various embodiments.

A cut away perspective view of assembled multilayer fluidistor 200 is shown in FIG. 3. Multilayer fluidistor 200 may include a circumferential weld line 252 between first glass substrate 210 and second glass substrate 223, a circumferential weld line 253 between second glass substrate 223 and third glass substrate 225, a circumferential weld line 254 between third glass substrate 225 and fourth glass substrate 227, and a circumferential weld line 256 between fourth glass substrate 227 and fifth glass substrate 230.

During one mode of operation, as shown in FIG. 3, gate transmission element 240 may be urged downward by a gate pressure exerted through fluidic gate 212 against gate pressure receiving surface 243, so that closure surface 247 contacts a portion of upper bonding surface 238 proximate to fluidic source 232 and fluidic drain 234. In the present embodiment, upper bonding surface 238 and closure surface 247 may include conformal, planar surfaces. This contact closes the fluid connection between the fluidic source 232 and the fluidic drain 234. During this actuation, vent 226 may relieve pressure between gate portion 242 and third glass substrate 225.

By decreasing or removing the gate pressure applied to the gate pressure receiving surface 243, the closure surface 247 may move away from the source and drain 232, 234 as the gate transmission element 240 moves from the second (closed) position to a first (open) position.

Figure 4:
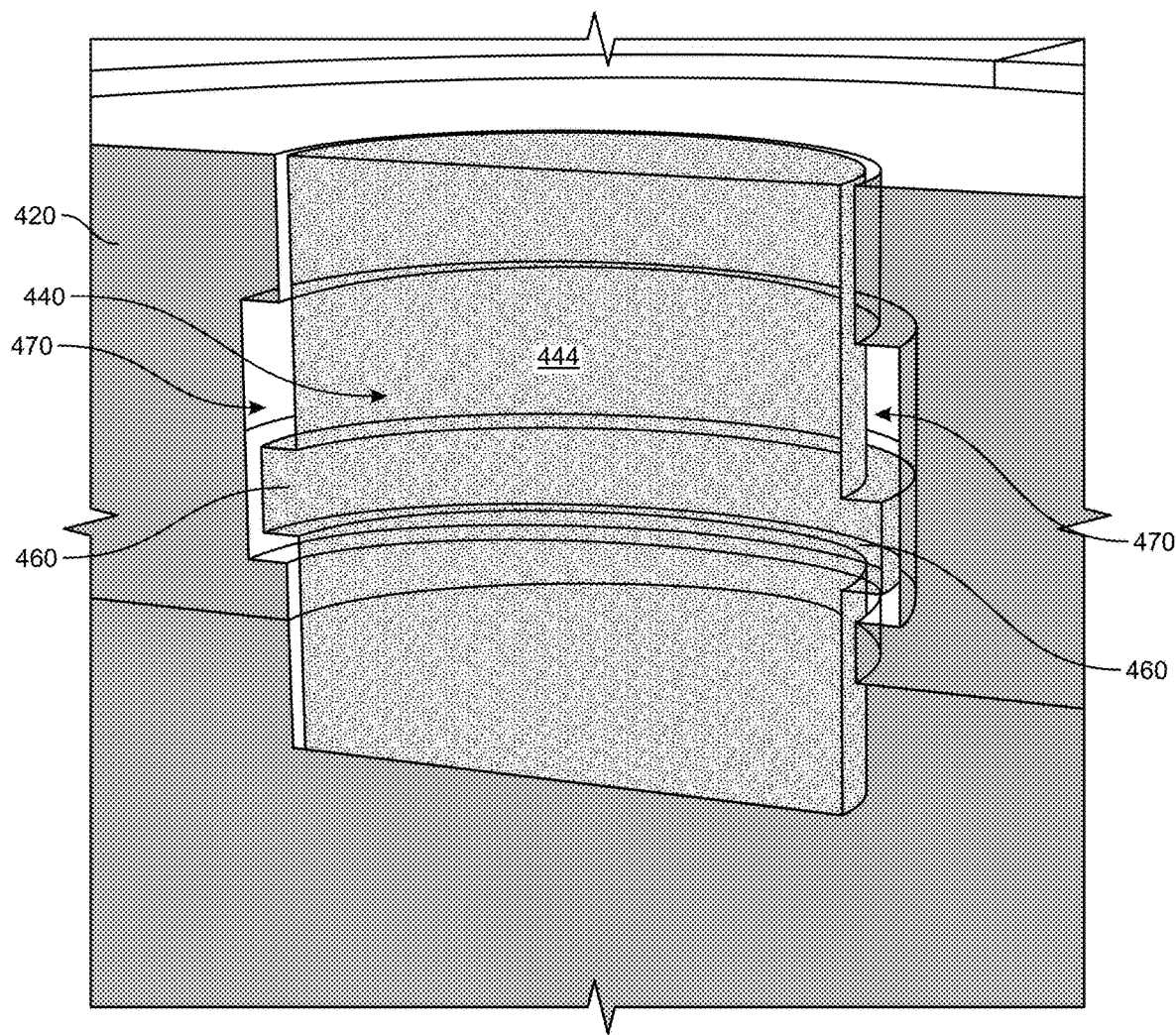
FIG. 4 is a schematic illustration of a gate transmission element having a flange according to some embodiments.

According to some embodiments, a gate transmission element formed within a substrate may include a protruding fixture such as a flange that allows slidable motion of the gate transmission element while preventing the gate transmission element from being separated from the substrate. Referring to FIG. 4, a gate transmission element 440 is disposed within substrate 420 and includes a body portion 444 having a peripheral, radially-extending flange 460 configured to slidably ride within track 470 that is etched into the substrate 420 adjacent to the gate transmission element 440. In the example of FIG. 4, flange 460 is integral with body portion 444 such that the gate transmission element 440 constitutes a unitary part.

Figure 5:
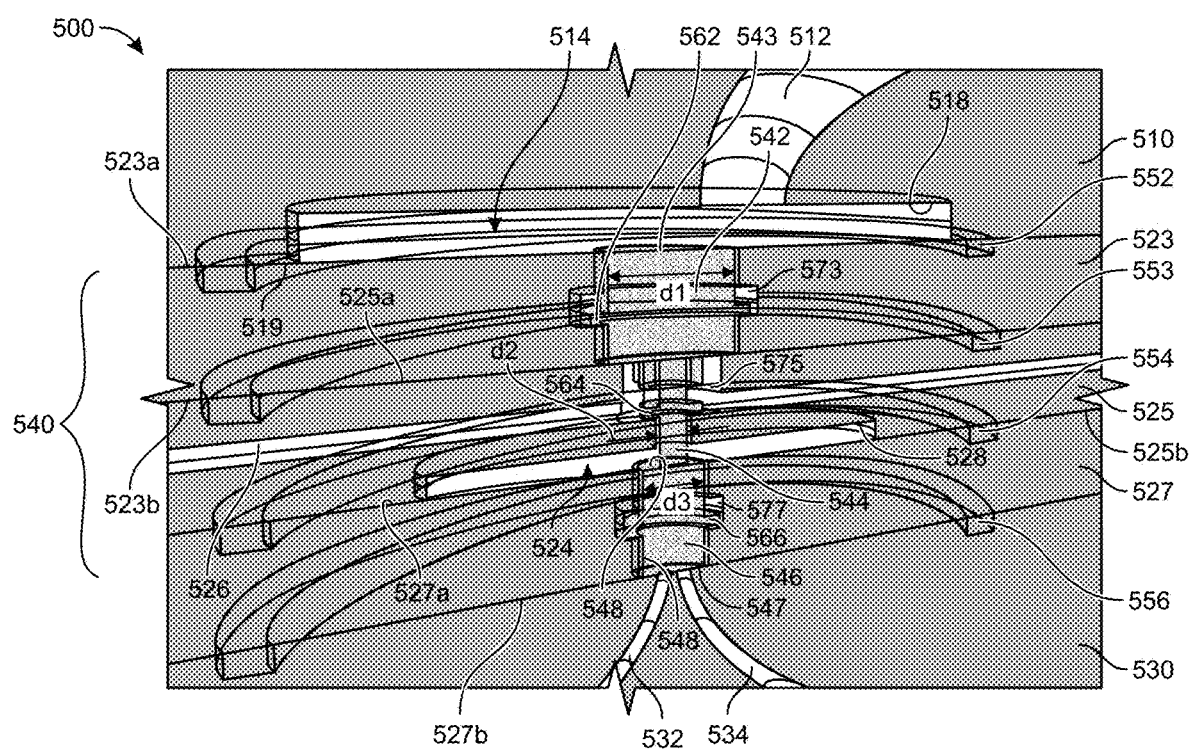
FIG. 5 is a perspective view of an assembled multilayer fluidic device including a gate transmission element having a flange according to various embodiments.

The incorporation into a fluidic device of a segmented gate transmission element, where each portion of the gate transmission element includes a flange, is shown in FIG. 5. Multilayer fluidistor 500 includes, from top to bottom, a first substrate 510, a second substrate 523, a third substrate 525, a fourth substrate 527, and a fifth substrate 530. The substrates 510, 523, 525, 527, and 530 may include transparent glass substrates.

Following SLE processing, first glass substrate 510 may include a fluidic gate 512 that extends through the substrate to an upper chamber portion 514. Adjacent to upper chamber portion 514, a polished, unetched bonding surface 519 may be joined (e.g., laser welded) to the bonding surface of an adjacent glass substrate, such as second glass substrate 523.

Second glass substrate 523 may include the gate portion 542 of a gate transmission element 540. Gate portion 542 may extend completely through the body of the second glass substrate 523 and may include a gate pressure receiving surface 543 proximate to upper chamber portion 514. Gate pressure receiving surface 543 may include pristine, polished glass that is unetched by the SLE process. A flange 562 may be integral with, and extend radially from, gate portion 542. Flange 562 may be configured to slidably ride within track 573 that is etched into the substrate 523.

Located peripheral to gate portion 542, second glass substrate 523 may include an upper bonding surface 523a and a lower bonding surface 523b. Upper bonding surface 523a and lower bonding surface 523b may each include pristine, polished glass that is unetched by the SLE process. Portions of upper bonding surface 523a may be joined to bonding surface 519 of first glass substrate 510. In the illustrated embodiment, first glass substrate 510 and second glass substrate 523 may be bonded together along a circumferential weld line 552. Lower bonding surface 523b may be joined (e.g., laser welded) to the bonding surface of an adjacent glass substrate, such as third glass substrate 525.

Third glass substrate 525 is positioned beneath the second glass substrate 523 and includes a lower chamber portion 524, a vent 526, and a connecting portion 544 of gate transmission element 540 located within lower chamber portion 524. An upper surface of connecting portion 544 may be in direct contact with a lower surface of the gate portion 542. A flange 564 may be integral with, and extend radially from, connecting portion 544. Flange 564 may be configured to slidably ride within track 575 that is etched into the third substrate 525.

Third glass substrate 525 may include an upper bonding surface 525a and a lower bonding surface 525b peripheral to connecting portion 544. Upper bonding surface 525a and lower bonding surface 525b may each include pristine, polished glass that is unetched by the SLE process. Portions of upper bonding surface 525a may be joined to lower bonding surface 523b of second glass substrate 523. In the illustrated embodiment, second glass substrate 523 and third glass substrate 525 may be bonded together along a circumferential weld line 553. Lower bonding surface 525b may be joined (e.g., laser welded) to the bonding surface of an adjacent glass substrate, such as fourth glass substrate 527.

Fourth glass substrate 527 is located beneath third glass substrate 525. Fourth glass substrate 527 includes a closure portion 546 of gate transmission element 540, which may extend completely through the body of the fourth glass substrate 527. An upper surface 548 of the closure portion 546 may be in direct contact with a lower surface of the connecting portion 544. Closure portion 546 may include closure surfaces 547, 548 proximate to respective adjacent substrates 530, 525. Lower closure surface 547 and upper closure surface 548 may each include pristine, polished glass that is unetched by the SLE process. A flange 566 may be integral with, and extend radially from, closure portion 546. Flange 566 may be configured to slidably ride within track 577 that is etched into the substrate 527.

Fourth glass substrate 527 may include an upper bonding surface 527a and a lower bonding surface 527b peripheral to closure portion 546. Upper bonding surface 527a and lower bonding surface 527b may each include pristine, polished glass that is unetched by the SLE process. Portions of upper bonding surface 527a may be joined to lower bonding surface 525b of third glass substrate 525. In the illustrated embodiment, third glass substrate 525 and fourth glass substrate 527 may be bonded together along a circumferential weld line 554. Lower bonding surface 527b of fourth glass substrate 527 may be joined (e.g., laser welded) to the bonding surface of an adjacent glass substrate, such as fifth glass substrate 530.

Fifth glass substrate 530 may include a fluidic source 532 and a fluidic drain 534 that extend through the fifth substrate 530, and a pristine, polished (i.e., unetched) upper bonding surface 538. Portions of upper bonding surface 538 may be joined (e.g., laser welded) to the lower bonding surface 527b of fourth glass substrate 527. In the illustrated embodiment, fourth glass substrate 527 and fifth glass substrate 530 may be bonded together along a circumferential weld line 556. Fluidic source 532 may be adapted to receive fluid, which may be conveyed to lower chamber portion 524. Fluidic drain 534 may be adapted to convey fluid away from lower chamber portion 524.

Gate transmission element 540 may be sized to allow fluid flow around the gate transmission element, i.e., between the gate transmission element 540 and substrates 523, 525, 527 to provide a suitable pressure drop between the gate 512 and the source 532 and/or drain 534. As will be appreciated, upper and lower chamber portions 514, 524 may provide suitable headspace to allow translational motion of gate transmission element 540 between first (open) and second (closed) positions.

During operation of the fluidistor 500, gate transmission element 540, including gate portion 542 and closure portion 546, may be urged upward such that gate pressure receiving surface 543 contacts sealing surface 518 of upper chamber portion 514 while upper closure surface 548 contacts sealing surface 528 of lower chamber portion 524. As will be appreciated, however, the etch processes used to form upper chamber portion 514 and lower chamber portion 524 may produce roughened sealing surfaces 518, 528, which may hinder or inhibit the formation of a fluid-tight seal between the sealing surface 518 and the gate pressure receiving surface 543 and/or between the sealing surface 528 and the upper closure surface 548.

According to some embodiments, the propensity for sealing surface roughening during wet etching may be avoided during SLE processing. In example methods, in lieu of forming a motion-accommodating headspace between a stationary component such as a substrate (e.g., first substrate 510 or third substrate 525) and an adjacent moveable component (e.g., gate portion 542 or closure portion 546), suitable "headspace" to allow translational motion of a gate transmission element, e.g., between first (open) and second (closed) positions, may be formed by etching the gate transmission element itself.

Figure 6:
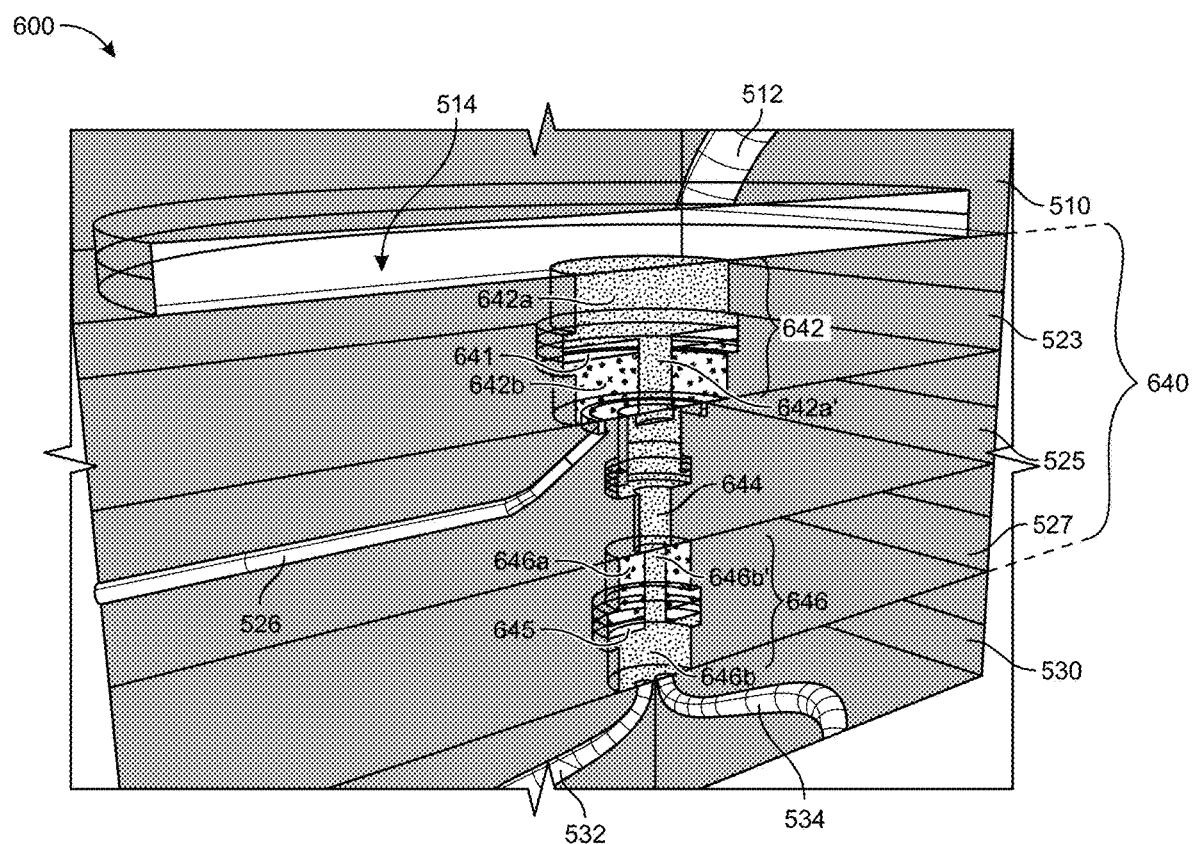
FIG. 6 is a perspective view of an assembled multilayer fluidic device including a gate transmission element having at least one bifurcated flange according to further embodiments.

Referring to FIG. 6, during SLE processing to form fluidistor 600, second substrate 523 may be etched to form gate portion 642 of gate transmission element 640 and fourth substrate 527 may be etched to form closure portion 646. The etching may form an axially- and radially-extending gap 641 in gate portion 642 and, in a similar vein, an axially- and radially-extending gap 645 may be etched entirely through closure portion 646. Gap 641 divides gate portion 642 into an upper gate portion 642a and a lower gate portion 642b, and gap 645 divides closure portion 646 into an upper closure portion 646a and a lower closure portion 646b. In some embodiments, upper and lower gate portions 642a, 642b, and upper and lower closure portions 646a, 646b may be wholly separate components that may be moved independently. By locating gaps 641, 645 interior to gate portion 642 and closure portion 646, respectively, translational motion of one or more components of gate transmission element 640 is enabled without creating etch-induced roughness of a surface used for bonding or sealing.

In the illustrated embodiment, lower gate portion 642b and upper closure portion 646a may each have an annular architecture. Upper gate portion 642a may include an axial segment 642a' that extends through the annulus in lower gate portion 642b such that a distal end of the axial segment 642a' may contact an upper surface of connecting portion 644. An upper region of connecting portion 644 may include a recess for slidably and reversibly engaging the distal end of the axial segment 642a'. Referring still to FIG. 6, lower closure portion 646b may include an axial segment 646b' that extends through the annulus in upper closure portion 646a such that a distal end of the axial segment 646b' may contact a lower surface of connecting portion 644. The embedded headspace architecture of FIG. 6 may decrease fluid leakage between adjacent components and accordingly improve the flow kinetics of fluidistor 600 relative to alternate configurations.

Figure 7:
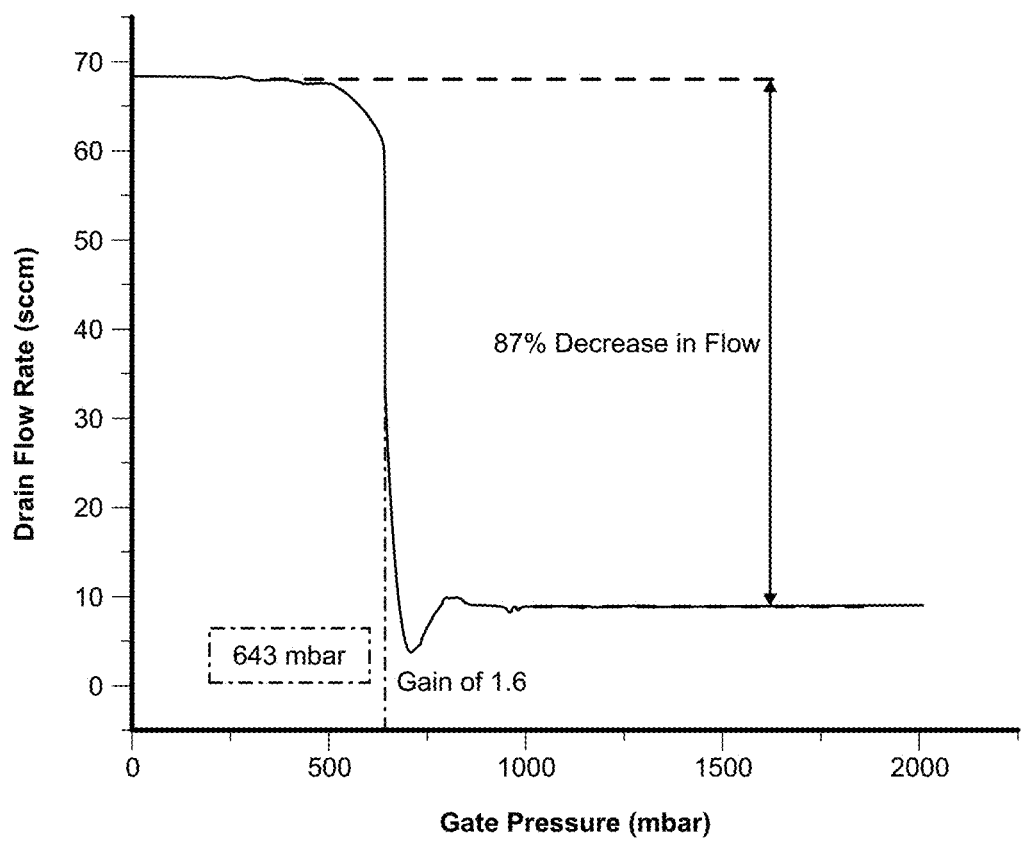
FIG. 7 is a plot of drain flow rate versus gate pressure showing the operation of an example monolithic fluidistor according to some embodiments.

A plot of flow rate through the drain of an example fluidic valve as a function of pressure applied through the gate to a gate pressure receiving surface of a gate transmission element is shown in FIG. 7, where an increase in gate pressure to approximately 640 mbar substantially abates fluid flow through the drain. A nearly 90% decrease in flow rate is measured. Although the instant example illustrates that an applied pressure of approximately 640 mbar may be used to turn off flow to the drain, it will be appreciated that one or more design features may be adjusted to modify the requisite pressure, including the dimensions and dimensional tolerances of the gate transmission element.

As disclosed herein, a layered fluidistor may be formed using a selective laser-induced etching (SLE) process.

Selective laser-induced etching is a hybrid, subtractive 3D glass manufacturing process that includes focused (localized) laser beam irradiation of a glass substrate followed by wet etching. The wet etching preferentially removes irradiated portions of the substrate to produce in situ apertures, channels, and additional structures, including dynamic structures such as a gate transmission element. According to some embodiments, the irradiation and etching kinetics may be tuned to accurately control the size and position of the etched features.

Elements of a multilayer fluidistor structure may be formed in respective glass substrates, which may be stacked, aligned, and bonded. For example, following SLE processing, a pulsed laser process may be used to hermetically bond fused silica substrates with a high strength interface. In particular embodiments, wet etching of the bonding surfaces of adjacent glass substrates may be avoided to preserve the surface finish and facilitate a fluid-tight seal. The disclosed direct-write process is readily scalable and may be more economical than comparative processes, such as photolithography-based methods.

EXAMPLE EMBODIMENTS

Example 1: A device includes two or more stacked and bonded layers of a rigid body material forming a body, the body having (a) a chamber, (b) a fluidic gate, a fluidic source, and a fluidic drain, each configured to be in fluid communication with the chamber, and (c) a gate transmission element slidably disposed within the chamber.

Example 2: The device of Example 1, where a position of the gate transmission element is controllable between a first position and a second position using a gate pressure received through the fluidic gate such that: when in the first position, the gate transmission element is situated to at least substantially prevent fluid flow between the fluidic source and the fluidic drain, and when in the second position, the gate transmission element is situated to allow fluid flow between the fluidic source and the fluidic drain.

Example 3: The device of any of Examples 1 and 2, where the fluidic gate is disposed within a first layer of the rigid body material, the gate transmission element is disposed entirely within a second layer of the rigid body material, and the fluidic source and the fluidic drain are each disposed within a third layer of the rigid body material, the second layer of the rigid body material being located between the first layer of the rigid body material and the third layer of the rigid body material.

Example 4: The device of any of Examples 1-3, where the gate transmission element includes a flange.

Example 5: The device of any of Examples 1-4, where the gate transmission element includes (a) a gate portion located within a first layer of the rigid body material, (b) a connecting portion in contact with the gate portion and located within a second layer of the rigid body material, and (c) a closure portion in contact with the connecting portion and located within a third layer of the rigid body material.

Example 6: The device of Example 5, where the gate portion includes a first segment and a second segment, and the first segment is separated by a gap from the second segment.

Example 7: A device including two or more stacked layers of a rigid body material forming a body, the body having (a) a chamber, (b) a fluidic gate, a fluidic source, and a fluidic drain, each configured to be in fluid communication with the chamber, and (c) a gate transmission element slidably disposed within the chamber, wherein a seal is disposed between adjacent layers peripheral to the chamber between each pair of adjacent layers.

Example 8: The device of Example 7, where the seal includes a laser weld.

Example 9: The device of any of Examples 7 and 8, where the device is coupled to a fluidic haptics device responsive to a control signal received from an artificial reality system.

Example 10: A method includes providing a plurality of rigid substrates, including a first rigid substrate and a second rigid substrate, where the plurality of rigid substrates are at least semi-transparent, selectively exposing portions of the first rigid substrate and the second rigid substrate to laser radiation, chemically etching the portions of the first rigid substrate and the second rigid substrate that were exposed to the laser radiation, and bonding the first rigid substrate to the second rigid substrate along a common interface to form a fluidic valve.

Example 11: The method of Example 10, where the first rigid substrate and the second rigid substrate each include a transparent glass.

Example 12: The method of any of Examples 10 and 11, further including coupling the fluidic valve to a fluidic haptics device of an artificial reality system.

Example 13: The method of any of Examples 10-12, where the fluidic valve includes a body having a chamber, and a gate transmission element located within the chamber.

Example 14: The method of Example 13, where the gate transmission element is formed in situ within the chamber.

Example 15: The method of any of Examples 13 and 14, where the gate transmission element includes a flange.

Example 16: The method of any of Examples 13-15, where a first portion of the gate transmission element is disposed within the first rigid substrate and a second portion of the gate transmission element is disposed within the second rigid substrate.

Example 17: The method of claim 16, wherein the chemical etching includes forming a gap between a first segment of the first portion and a second segment of the first portion.

Example 18: The method of any of Examples 13-17, where a position of the gate transmission element is controllable between a first position and a second position using a gate pressure received through a fluidic gate such that (a) when in the first position, the gate transmission element is situated to at least substantially prevent fluid flow between the fluidic source and the fluidic drain, and (b) when in the second position, the gate transmission element is situated to allow fluid flow between the fluidic source and the fluidic drain.

Example 19: The method of any of Examples 10-18, where bonding the first rigid substrate to the second rigid substrate includes exposing at least one of the first rigid substrate and the second rigid substrate to laser radiation in a region proximate to the interface and decreasing a viscosity within the exposed region.

Example 20: The method of any of Examples 10-19, where bonding the first rigid substrate to the second rigid substrate includes forming a hermetic seal peripheral to the fluidic valve.

Example 21: A fluidic valve includes a plurality of rigid layers bonded together in a stack configuration to form a body, where the body includes (a) a chamber that is defined by at least one rigid layer of the plurality of rigid layers, and (b) a fluidic gate, a fluidic source, and a fluidic drain, each of which is fluidically coupled with the chamber, and a gate transmission element slidably disposed within the chamber, where the gate transmission element is configured to regulate fluid flow between the fluidic source and the fluidic drain.

AR/VR Applications

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 800 in FIG. 8) or that visually immerses a user in an artificial reality (such as, e.g., virtual-reality system 900 in FIG. 9). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 8:
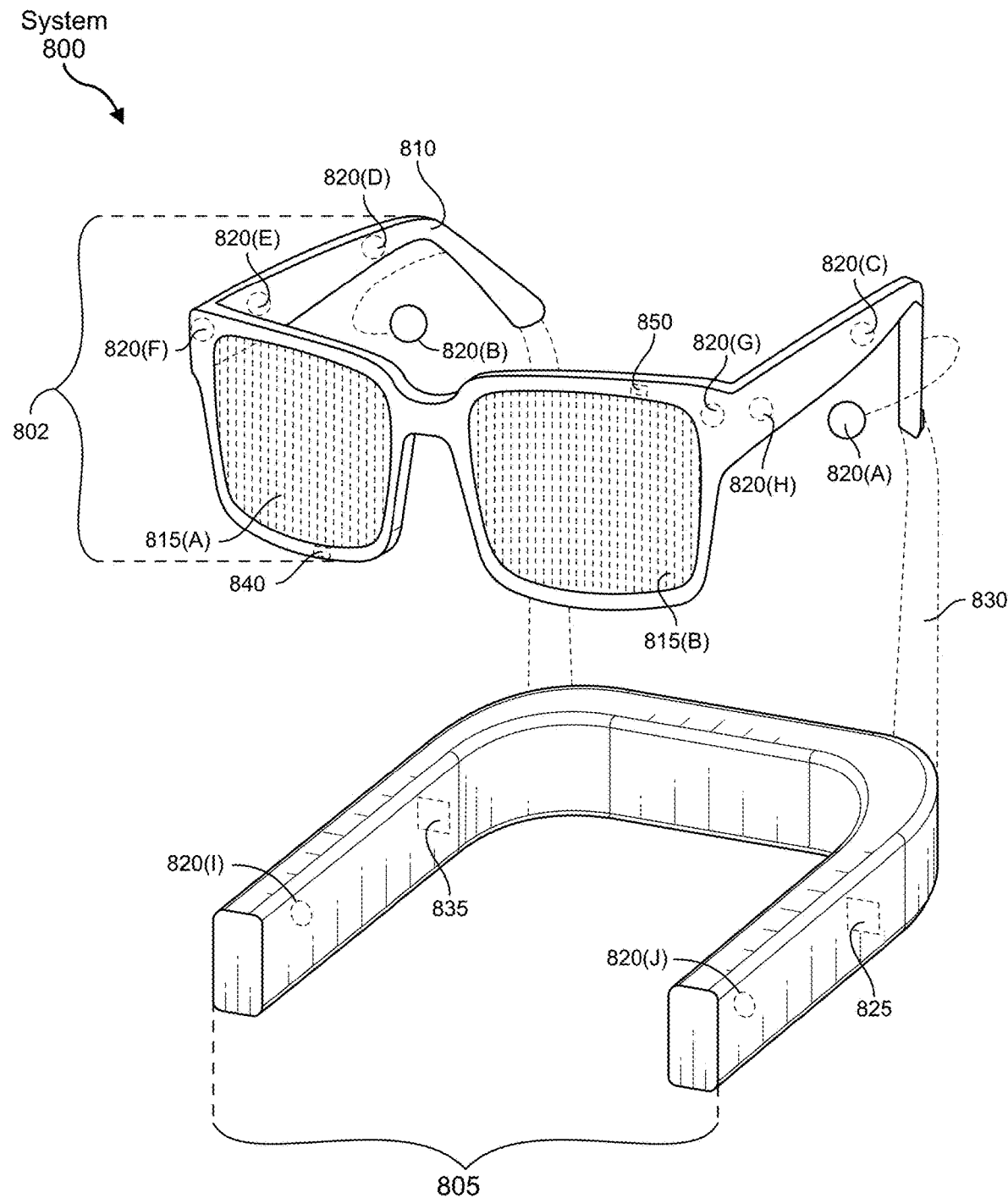
FIG. 8 is an illustration of exemplary augmented-reality glasses that may be used in connection with embodiments of this disclosure.

Turning to FIG. 8, augmented-reality system 800 may include an eyewear device 802 with a frame 810 configured to hold a left display device 815(A) and a right display device 815(B) in front of a user's eyes. Display devices 815(A) and 815(B) may act together or independently to present an image or series of images to a user. While augmented-reality system 800 includes two displays, embodiments of this disclosure may be implemented in augmented-reality systems with a single NED or more than two NEDs.

In some embodiments, augmented-reality system 800 may include one or more sensors, such as sensor 840. Sensor 840 may generate measurement signals in response to motion of augmented-reality system 800 and may be located on substantially any portion of frame 810. Sensor 840 may represent one or more of a variety of different sensing mechanisms, such as a position sensor, an inertial measurement unit (IMU), a depth camera assembly, a structured light emitter and/or detector, or any combination thereof. In some embodiments, augmented-reality system 800 may or may not include sensor 840 or may include more than one sensor. In embodiments in which sensor 840 includes an IMU, the IMU may generate calibration data based on measurement signals from sensor 840. Examples of sensor 840 may include, without limitation, accelerometers, gyroscopes, magnetometers, other suitable types of sensors that detect motion, sensors used for error correction of the IMU, or some combination thereof.

In some examples, augmented-reality system 800 may also include a microphone array with a plurality of acoustic transducers 820(A)-820(J), referred to collectively as acoustic transducers 820. Acoustic transducers 820 may represent transducers that detect air pressure variations induced by sound waves. Each acoustic transducer 820 may be configured to detect sound and convert the detected sound into an electronic format (e.g., an analog or digital format). The microphone array in FIG. 8 may include, for example, ten acoustic transducers: 820(A) and 820(B), which may be designed to be placed inside a corresponding ear of the user, acoustic transducers 820(C), 820(D), 820(E), 820(F), 820(G), and 820(H), which may be positioned at various locations on frame 810, and/or acoustic transducers 820(I) and 820(J), which may be positioned on a corresponding neckband 805.

In some embodiments, one or more of acoustic transducers 820(A)-(J) may be used as output transducers (e.g., speakers). For example, acoustic transducers 820(A) and/or 820(B) may be earbuds or any other suitable type of headphone or speaker.

The configuration of acoustic transducers 820 of the microphone array may vary. While augmented-reality system 800 is shown in FIG. 8 as having ten acoustic transducers 820, the number of acoustic transducers 820 may be greater or less than ten. In some embodiments, using higher numbers of acoustic transducers 820 may increase the amount of audio information collected and/or the sensitivity and accuracy of the audio information. In contrast, using a lower number of acoustic transducers 820 may decrease the computing power required by an associated controller 850 to process the collected audio information. In addition, the position of each acoustic transducer 820 of the microphone array may vary. For example, the position of an acoustic transducer 820 may include a defined position on the user, a defined coordinate on frame 810, an orientation associated with each acoustic transducer 820, or some combination thereof.

Acoustic transducers 820(A) and 820(B) may be positioned on different parts of the user's ear, such as behind the pinna, behind the tragus, and/or within the auricle or fossa. Or, there may be additional acoustic transducers 820 on or surrounding the ear in addition to acoustic transducers 820 inside the ear canal. Having an acoustic transducer 820 positioned next to an ear canal of a user may enable the microphone array to collect information on how sounds arrive at the ear canal. By positioning at least two of acoustic transducers 820 on either side of a user's head (e.g., as binaural microphones), augmented-reality device 800 may simulate binaural hearing and capture a 3D stereo sound field around about a user's head. In some embodiments, acoustic transducers 820(A) and 820(B) may be connected to augmented-reality system 800 via a wired connection 830, and in other embodiments acoustic transducers 820(A) and 820(B) may be connected to augmented-reality system 800 via a wireless connection (e.g., a Bluetooth connection). In still other embodiments, acoustic transducers 820(A) and 820(B) may not be used at all in conjunction with augmented-reality system 800.

Acoustic transducers 820 on frame 810 may be positioned in a variety of different ways, including along the length of the temples, across the bridge, above or below display devices 815(A) and 815(B), or some combination thereof. Acoustic transducers 820 may also be oriented such that the microphone array is able to detect sounds in a wide range of directions surrounding the user wearing the augmented-reality system 800. In some embodiments, an optimization process may be performed during manufacturing of augmented-reality system 800 to determine relative positioning of each acoustic transducer 820 in the microphone array.

In some examples, augmented-reality system 800 may include or be connected to an external device (e.g., a paired device), such as neckband 805. Neckband 805 generally represents any type or form of paired device. Thus, the following discussion of neckband 805 may also apply to various other paired devices, such as charging cases, smart watches, smart phones, wrist bands, other wearable devices, hand-held controllers, tablet computers, laptop computers, other external compute devices, etc.

As shown, neckband 805 may be coupled to eyewear device 802 via one or more connectors. The connectors may be wired or wireless and may include electrical and/or non-electrical (e.g., structural) components. In some cases, eyewear device 802 and neckband 805 may operate independently without any wired or wireless connection between them. While FIG. 8 illustrates the components of eyewear device 802 and neckband 805 in example locations on eyewear device 802 and neckband 805, the components may be located elsewhere and/or distributed differently on eyewear device 802 and/or neckband 805. In some embodiments, the components of eyewear device 802 and neckband 805 may be located on one or more additional peripheral devices paired with eyewear device 802, neckband 805, or some combination thereof.

Pairing external devices, such as neckband 805, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 800 may be provided by a paired device or shared between a paired device and an eyewear device, thus reducing the weight, heat profile, and form factor of the eyewear device overall while still retaining desired functionality. For example, neckband 805 may allow components that would otherwise be included on an eyewear device to be included in neckband 805 since users may tolerate a heavier weight load on their shoulders than they would tolerate on their heads. Neckband 805 may also have a larger surface area over which to diffuse and disperse heat to the ambient environment. Thus, neckband 805 may allow for greater battery and computation capacity than might otherwise have been possible on a stand-alone eyewear device. Since weight carried in neckband 805 may be less invasive to a user than weight carried in eyewear device 802, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 805 may be communicatively coupled with eyewear device 802 and/or to other devices. These other devices may provide certain functions (e.g., tracking, localizing, depth mapping, processing, storage, etc.) to augmented-reality system 800. In the embodiment of FIG. 8, neckband 805 may include two acoustic transducers (e.g., 820(I) and 820(J)) that are part of the microphone array (or potentially form their own microphone subarray). Neckband 805 may also include a controller 825 and a power source 835.

Acoustic transducers 820(I) and 820(J) of neckband 805 may be configured to detect sound and convert the detected sound into an electronic format (analog or digital). In the embodiment of FIG. 8, acoustic transducers 820(I) and 820(J) may be positioned on neckband 805, thereby increasing the distance between the neckband acoustic transducers 820(I) and 820(J) and other acoustic transducers 820 positioned on eyewear device 802. In some cases, increasing the distance between acoustic transducers 820 of the microphone array may improve the accuracy of beamforming performed via the microphone array. For example, if a sound is detected by acoustic transducers 820(C) and 820(D) and the distance between acoustic transducers 820(C) and 820(D) is greater than, e.g., the distance between acoustic transducers 820(D) and 820(E), the determined source location of the detected sound may be more accurate than if the sound had been detected by acoustic transducers 820(D) and 820(E).

Controller 825 of neckband 805 may process information generated by the sensors on neckband 805 and/or augmented-reality system 800. For example, controller 825 may process information from the microphone array that describes sounds detected by the microphone array. For each detected sound, controller 825 may perform a direction-of-arrival (DOA) estimation to estimate a direction from which the detected sound arrived at the microphone array. As the microphone array detects sounds, controller 825 may populate an audio data set with the information. In embodiments in which augmented-reality system 800 includes an inertial measurement unit, controller 825 may compute all inertial and spatial calculations from the IMU located on eyewear device 802. A connector may convey information between augmented-reality system 800 and neckband 805 and between augmented-reality system 800 and controller 825. The information may be in the form of optical data, electrical data, wireless data, or any other transmittable data form. Moving the processing of information generated by augmented-reality system 800 to neckband 805 may reduce weight and heat in eyewear device 802, making it more comfortable to the user.

Power source 835 in neckband 805 may provide power to eyewear device 802 and/or to neckband 805. Power source 835 may include, without limitation, lithium ion batteries, lithium-polymer batteries, primary lithium batteries, alkaline batteries, or any other form of power storage. In some cases, power source 835 may be a wired power source. Including power source 835 on neckband 805 instead of on eyewear device 802 may help better distribute the weight and heat generated by power source 835.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 900 in FIG. 9, that mostly or completely covers a user's field of view. Virtual-reality system 900 may include a front rigid body 902 and a band 904 shaped to fit around a user's head. Virtual-reality system 900 may also include output audio transducers 906(A) and 906(B). Furthermore, while not shown in FIG. 9, front rigid body 902 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 800 and/or virtual-reality system 900 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 800 and/or virtual-reality system 900 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 800 and/or virtual-reality system 900 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, artificial-reality systems 800 and 900 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 9:
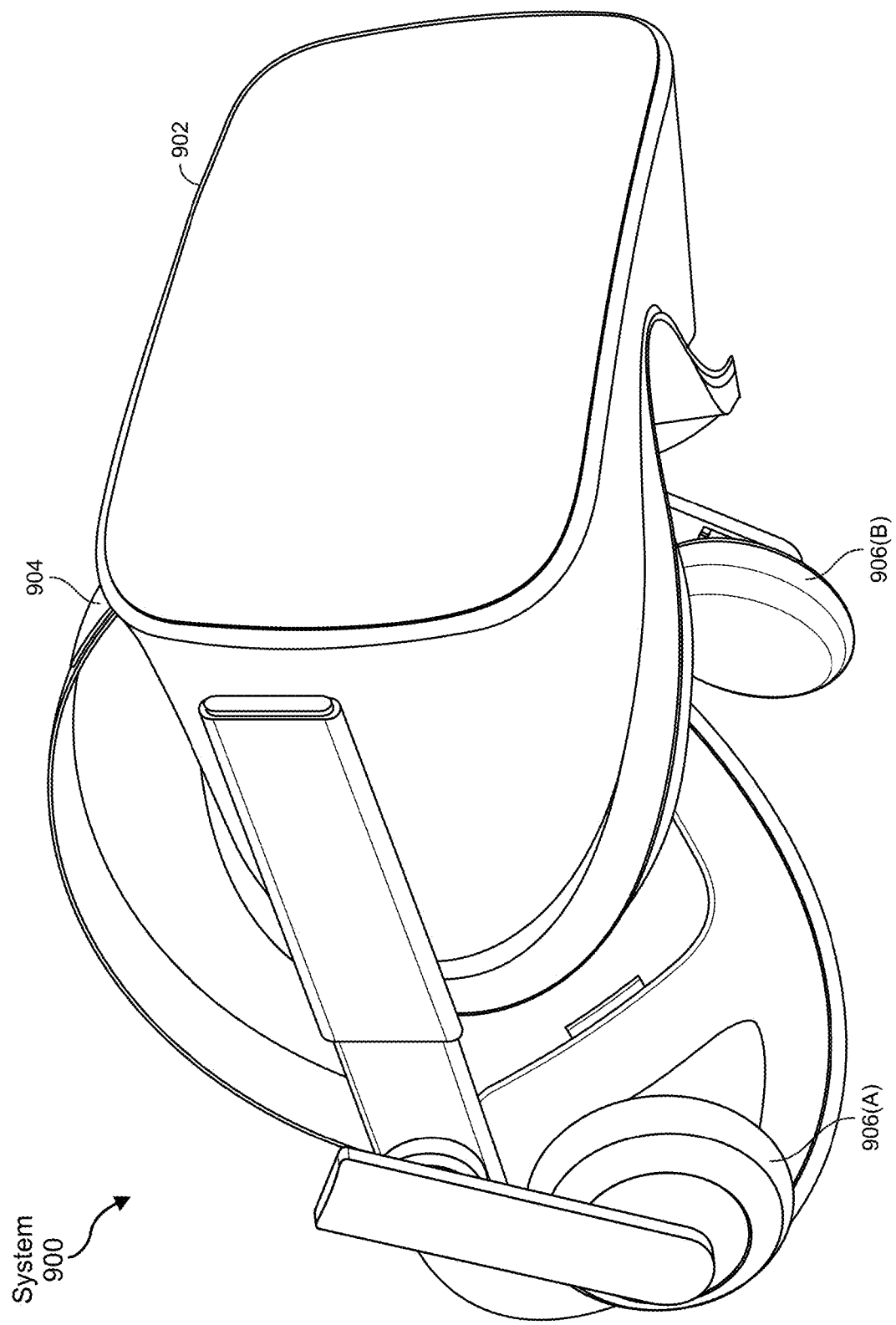
FIG. 9 is an illustration of an exemplary virtual-reality headset that may be used in connection with embodiments of this disclosure.

In some embodiments, an artificial reality system such as described in relation to FIG. 8 or 9, may include a fluidic circuit as described herein, such as a fluidic amplifier. In some examples, a fluidic amplifier may provide a fluidic output to a haptic device, or other actuator.

Haptic feedback may be provided by interfaces positioned within a user's environment (e.g., chairs, tables, floors, etc.) and/or interfaces on articles that may be worn or carried by a user (e.g., gloves, wristbands, etc.). In some examples, haptic feedback may be provided using a fluidic device. For example, a fluidic circuit (such as a fluidic circuit described herein) may be used to provide a time-dependent fluidic signal (e.g., including a time-dependent fluid pressure and/or flow rate) to a haptic device. The time-dependent fluidic signal may induce a perceptible vibration, pressure, actuation, or other tactile signal to a user. In some examples, an output load of a fluidic circuit may include a haptic device, such as a vibrotactor.

Figure 10:
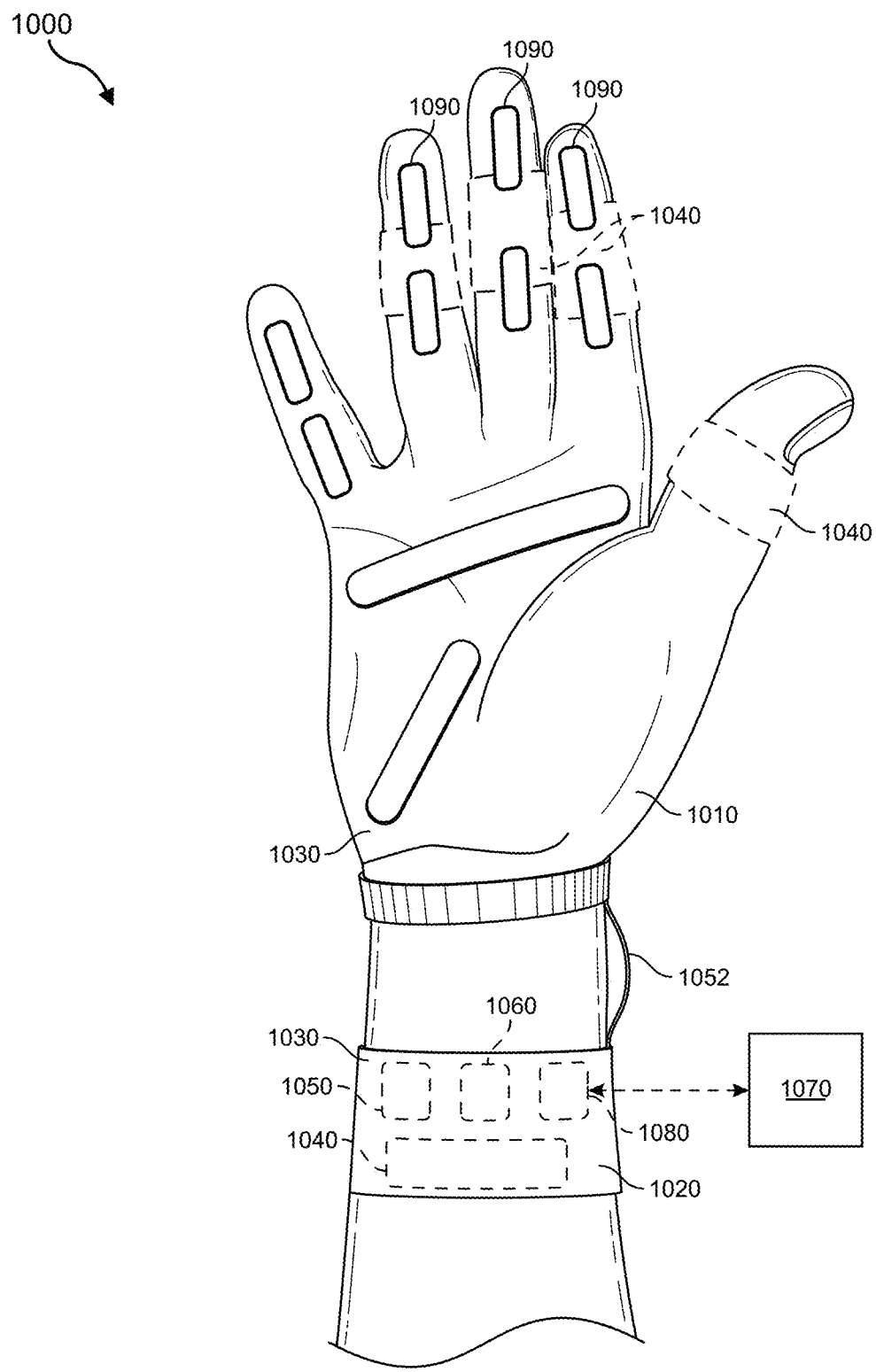
FIG. 10 is an illustration of exemplary haptic devices that may be used in connection with embodiments of this disclosure.

As an example, FIG. 10 illustrates a vibrotactile system 1000 in the form of a wearable glove (haptic device 1010) and wristband (haptic device 1020). Haptic device 1010 and haptic device 1020 are shown as examples of wearable devices that include a flexible, wearable textile material 1030 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1040 may be positioned at least partially within one or more corresponding pockets formed in textile material 1030 of vibrotactile system 1000. Vibrotactile devices 1040 may be positioned in locations to provide a vibrating sensation (e.g., haptic feedback) to a user of vibrotactile system 1000. For example, vibrotactile devices 1040 may be positioned against the user's finger(s), thumb, or wrist, as shown in FIG. 10. Vibrotactile devices 1040 may, in some examples, be sufficiently flexible to conform to or bend with the user's corresponding body part(s).

A power source 1050 (e.g., a battery) for applying a voltage to the vibrotactile devices 1040 for activation thereof may be electrically coupled to vibrotactile devices 1040, such as via conductive wiring 1052. In some examples, each of vibrotactile devices 1040 may be independently electrically coupled to power source 1050 for individual activation. In some embodiments, a processor 1060 may be operatively coupled to power source 1050 and configured (e.g., programmed) to control activation of vibrotactile devices 1040.

Vibrotactile system 1000 may be implemented in a variety of ways. In some examples, vibrotactile system 1000 may be a standalone system with integral subsystems and components for operation independent of other devices and systems. As another example, vibrotactile system 1000 may be configured for interaction with another device or system 1070. For example, vibrotactile system 1000 may, in some examples, include a communications interface 1080 for receiving and/or sending signals to the other device or system 1070. The other device or system 1070 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1080 may enable communications between vibrotactile system 1000 and the other device or system 1070 via a wireless (e.g., Wi-Fi, Bluetooth, cellular, radio, etc.) link or a wired link. If present, communications interface 1080 may be in communication with processor 1060, such as to provide a signal to processor 1060 to activate or deactivate one or more of the vibrotactile devices 1040.

Vibrotactile system 1000 may optionally include other subsystems and components, such as touch-sensitive pads 1090, pressure sensors, motion sensors, position sensors, lighting elements, and/or user interface elements (e.g., an on/off button, a vibration control element, etc.). During use, vibrotactile devices 1040 may be configured to be activated for a variety of different reasons, such as in response to the user's interaction with user interface elements, a signal from the motion or position sensors, a signal from the touch-sensitive pads 1090, a signal from pressure sensors, a signal from the other device or system 1070, etc.

Although power source 1050, processor 1060, and communications interface 1080 are illustrated in FIG. 10 as being positioned in haptic device 1020, the present disclosure is not so limited. For example, one or more of power source 1050, processor 1060, or communications interface 1080 may be positioned within haptic device 1010 or within another wearable textile.

Figure 11:
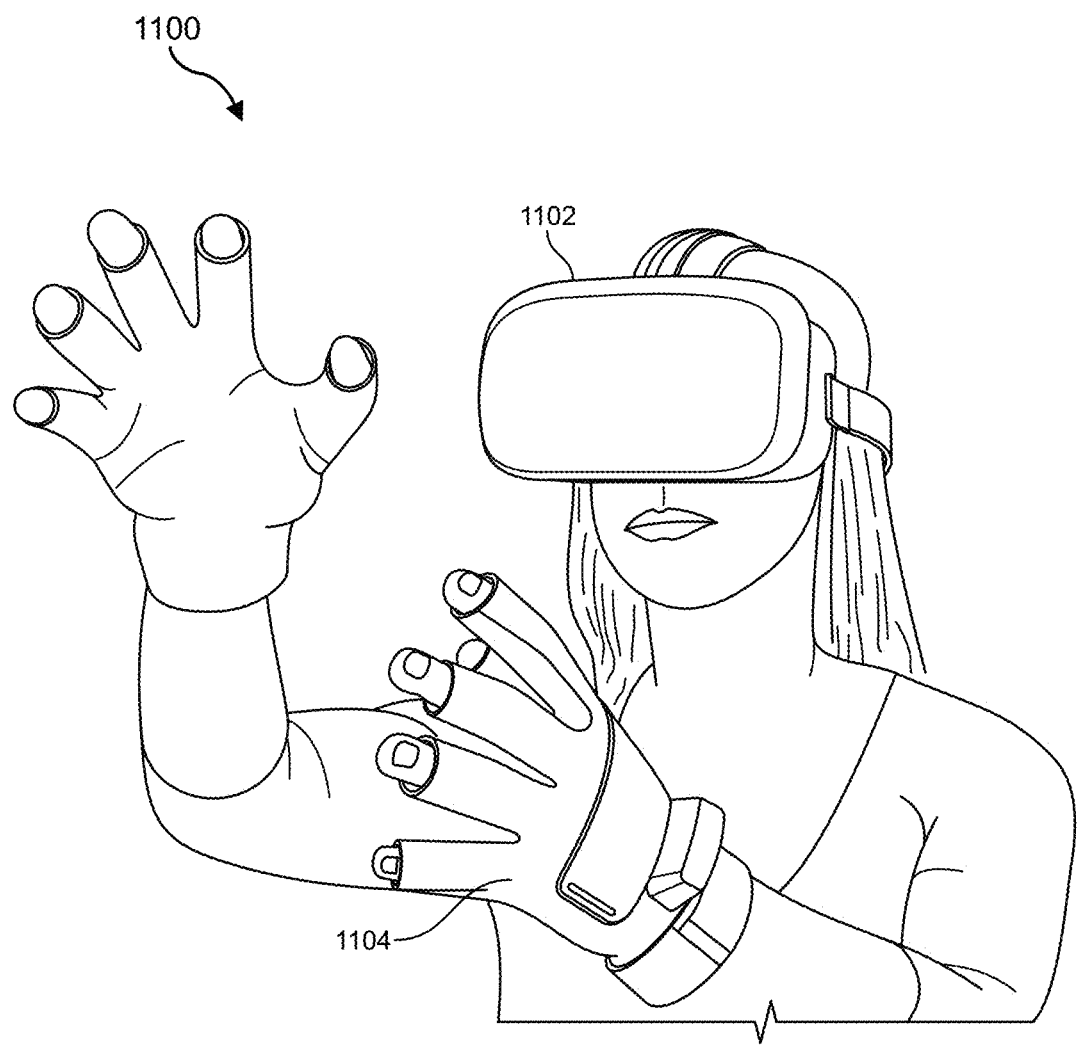
FIG. 11 is an illustration of an exemplary virtual-reality environment according to embodiments of this disclosure.

Haptic wearables, such as those shown in and described in connection with FIG. 10, may be implemented in a variety of types of artificial-reality systems and environments. FIG. 11 shows an example artificial-reality environment 1100 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Head-mounted display 1102 generally represents any type or form of virtual-reality system, such as virtual-reality system 900 in FIG. 9. Haptic device 1104 generally represents any type or form of wearable device, worn by a user of an artificial-reality system, that provides haptic feedback to the user to give the user the perception that he or she is physically engaging with a virtual object. In some embodiments, haptic device 1104 may provide haptic feedback by applying vibration, motion, and/or force to the user. For example, haptic device 1104 may limit or augment a user's movement. To give a specific example, haptic device 1104 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 1104 to send action requests to a console. Examples of action requests include, without limitation, requests to start an application and/or end the application and/or requests to perform a particular action within the application.

Figure 12:
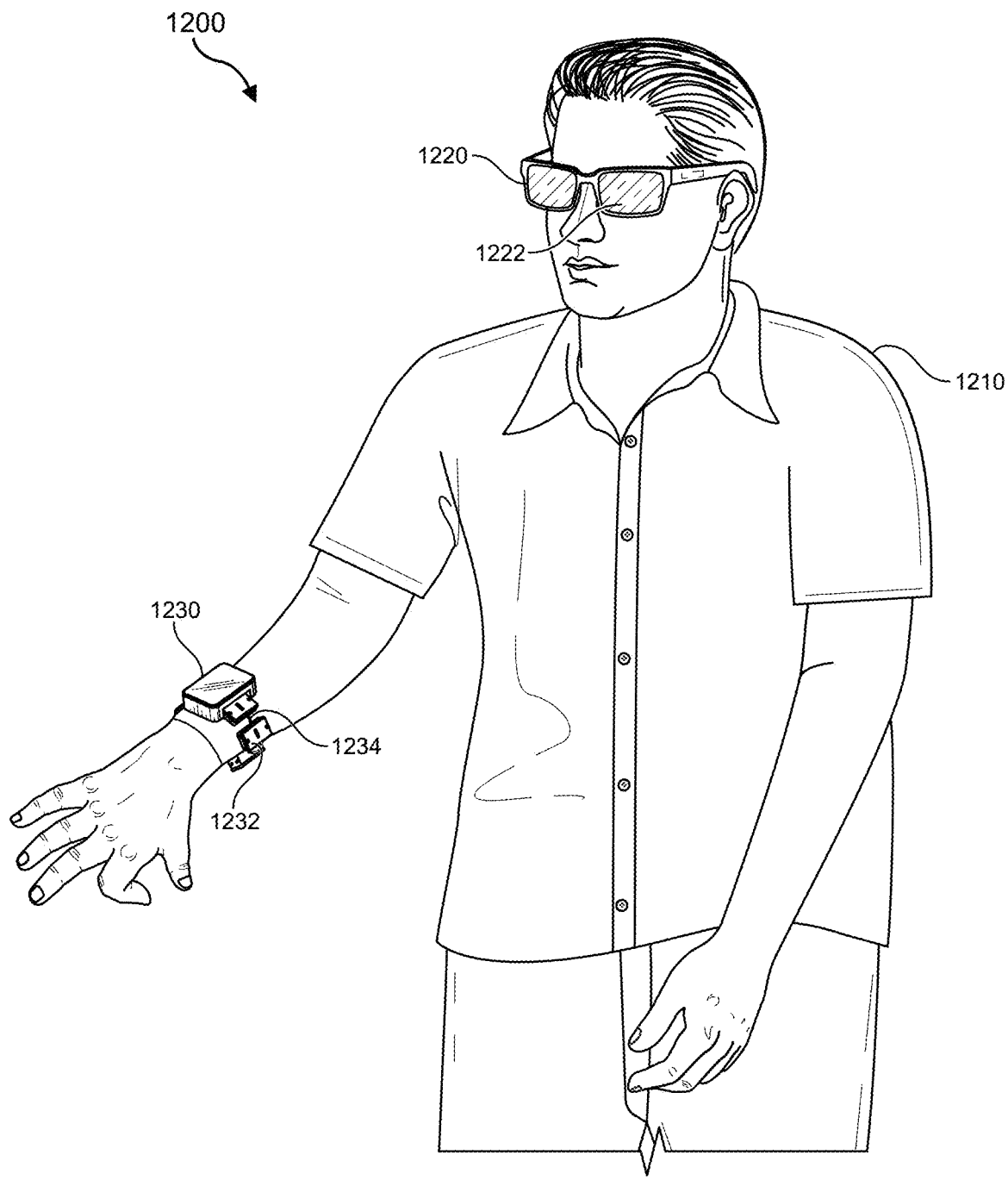
FIG. 12 is an illustration of an exemplary augmented-reality environment according to further embodiments of this disclosure.

While haptic interfaces may be used with virtual-reality systems, as shown in FIG. 11, haptic interfaces may also be used with augmented-reality systems, as shown in FIG. 12. FIG. 12 is a perspective view of a user 1210 interacting with an augmented-reality system 1200. In this example, user 1210 may wear a pair of augmented-reality glasses 1220 that may have one or more displays 1222 and that are paired with a haptic device 1230. In this example, haptic device 1230 may be a wristband that includes a plurality of band elements 1232 and a tensioning mechanism 1234 that connects band elements 1232 to one another.

One or more of band elements 1232 may include any type or form of actuator suitable for providing haptic feedback. For example, one or more of band elements 1232 may be configured to provide one or more of various types of cutaneous feedback, including vibration, force, traction, texture, and/or temperature. To provide such feedback, band elements 1232 may include one or more of various types of actuators. In one example, each of band elements 1232 may include a vibrotactor (e.g., a vibrotactile actuator) configured to vibrate in unison or independently to provide one or more of various types of haptic sensations to a user. Alternatively, only a single band element or a subset of band elements may include vibrotactors.

In some examples, the output load of a fluidic circuit may include one or more vibrotactors. A fluidic circuit may be used to provide a perceptible mechanical feedback to a body part of a user. In some examples, the body part may be a portion of the head, neck, arms, hands, torso, legs, feet, or other body part of a user.

Haptic devices 1010, 1020, 1104, and 1230 may include any suitable number and/or type of haptic transducer, sensor, and/or feedback mechanism. For example, haptic devices 1010, 1020, 1104, and 1230 may include one or more mechanical transducers, piezoelectric transducers, and/or fluidic transducers. Haptic devices 1010, 1020, 1104, and 1230 may also include various combinations of different types and forms of transducers that work together or independently to enhance a user's artificial-reality experience. In one example, each of band elements 1232 of haptic device 1230 may include a vibrotactor (e.g., a vibrotactile actuator) configured to vibrate in unison or independently to provide one or more of various types of haptic sensations to a user.

Figure 13:
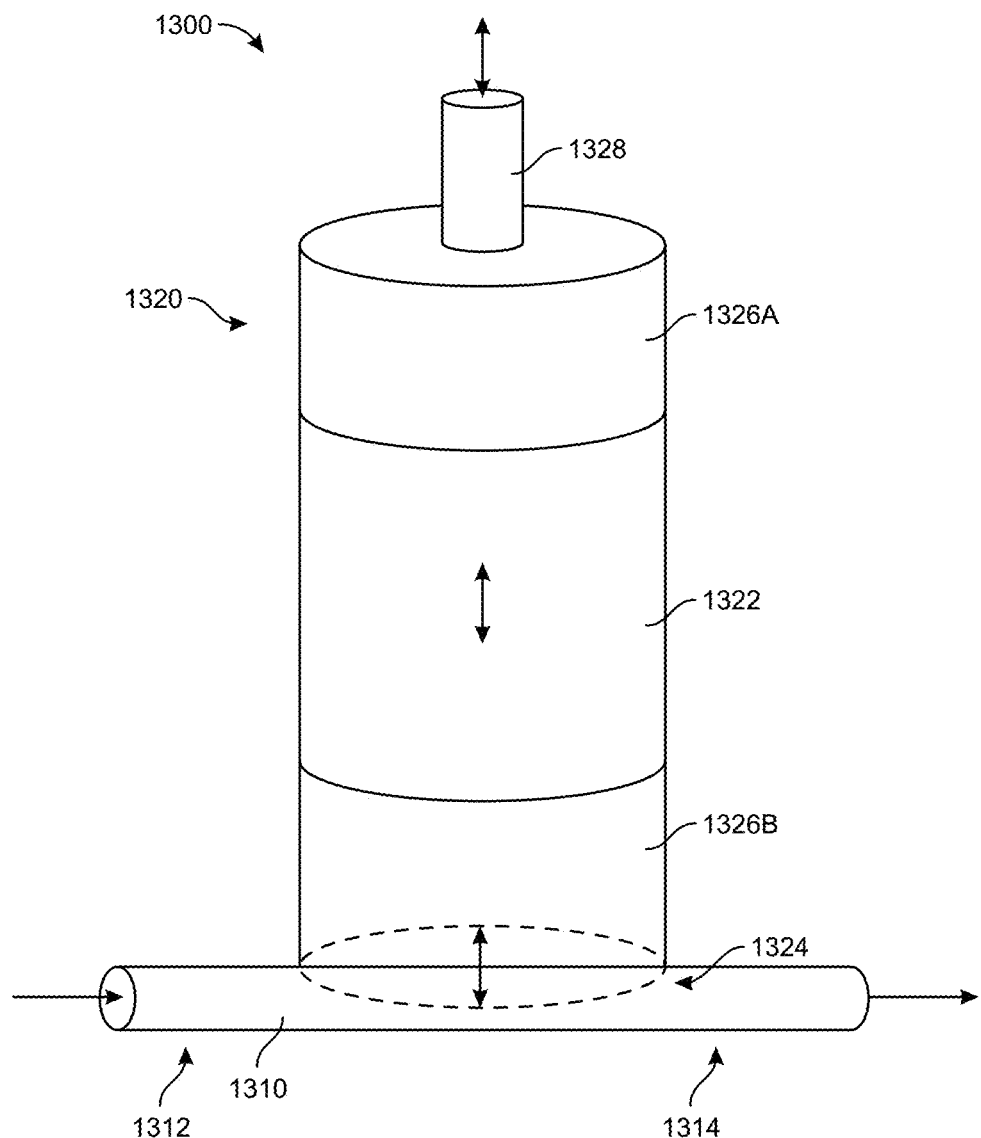
FIG. 13 is an illustration of an exemplary fluidic control system that may be used in connection with embodiments of this disclosure.

As noted above, the present disclosure may also include haptic fluidic systems that involve the control (e.g., stopping, starting, restricting, increasing, etc.) of fluid flow through a fluid channel. The control of fluid flow may be accomplished with a fluidic valve. FIG. 13 shows a schematic diagram of a fluidic valve 1300 for controlling flow through a fluid channel 1310, according to at least one embodiment of the present disclosure. Fluid from a fluid source (e.g., a pressurized fluid source, a fluid pump, etc.) may flow through the fluid channel 1310 from an inlet port 1312 to an outlet port 1314, which may be operably coupled to, for example, a fluid-driven mechanism, another fluid channel, or a fluid reservoir.

Fluidic valve 1300 may include a gate 1320 for controlling the fluid flow through fluid channel 1310. Gate 1320 may include a gate transmission element 1322, which may be a movable component that is configured to transmit an input force, pressure, or displacement to a restricting region 1324 to restrict or stop flow through the fluid channel 1310. Conversely, in some examples, application of a force, pressure, or displacement to gate transmission element 1322 may result in opening restricting region 1324 to allow or increase flow through the fluid channel 1310. The force, pressure, or displacement applied to gate transmission element 1322 may be referred to as a gate force, gate pressure, or gate displacement. Gate transmission element 1322 may be a rigid element (e.g., a movable piston, a lever, etc.).

As illustrated in FIG. 13, gate 1320 of fluidic valve 1300 may include one or more gate terminals, such as an input gate terminal 1326(A) and an output gate terminal 1326(B) (collectively referred to herein as "gate terminals 1326") on opposing sides of gate transmission element 1322. Gate terminals 1326 may be elements for applying a force (e.g., pressure) to gate transmission element 1322. By way of example, gate terminals 1326 may each be or include a fluid chamber adjacent to gate transmission element 1322. Alternatively or additionally, one or more of gate terminals 1326 may include a solid component, such as a lever, screw, or piston, that is configured to apply a force to gate transmission element 1322.

In some examples, a gate port 1328 may be in fluid communication with input gate terminal 1326(A) for applying a positive or negative fluid pressure within the input gate terminal 1326(A). A control fluid source (e.g., a pressurized fluid source, a fluid pump, etc.) may be in fluid communication with gate port 1328 to selectively pressurize and/or depressurize input gate terminal 1326(A). In additional embodiments, a force or pressure may be applied at the input gate terminal 1326(A) in other ways, such as with a piezoelectric element or an electromechanical actuator, etc.

In the embodiment illustrated in FIG. 13, pressurization of the input gate terminal 1326(A) may cause the gate transmission element 1322 to be displaced toward restricting region 1324, resulting in a corresponding pressurization of output gate terminal 1326(B). Pressurization of output gate terminal 1326(B) may, in turn, cause restricting region 1324 to partially or fully restrict to reduce or stop fluid flow through the fluid channel 1310. Depressurization of input gate terminal 1326(A) may cause gate transmission element 1322 to be displaced away from restricting region 1324, resulting in a corresponding depressurization of the output gate terminal 1326(B).

Depressurization of output gate terminal 1326(B) may, in turn, cause restricting region 1324 to partially or fully expand to allow or increase fluid flow through fluid channel 1310. Thus, gate 1320 of fluidic valve 1300 may be used to control fluid flow from inlet port 1312 to outlet port 1314 of fluid channel 1310.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

It will be understood that when an element such as a layer or a region is referred to as being formed on, deposited on, or disposed "on" or "over" another element, it may be located directly on at least a portion of the other element, or one or more intervening elements may also be present. In contrast, when an element is referred to as being "directly on" or "directly over" another element, it may be located on at least a portion of the other element, with no intervening elements present.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a glass substrate that comprises or includes a fused silica include embodiments where a glass substrate consists essentially of fused silica and embodiments where a glass substrate consists of fused silica.

What is claimed is:

1. A device, comprising:
   two or more stacked and bonded layers of a rigid body material forming a body, the body comprising:
   a chamber;
   a fluidic gate, a fluidic source, and a fluidic drain, each configured to be in fluid communication with the chamber; and
   a gate transmission element slidably disposed within the chamber, wherein the fluidic gate is disposed within a first layer of the rigid body material, the gate transmission element is disposed entirely within a second layer of the rigid body material, and the fluidic source and the fluidic drain are each disposed within a third layer of the rigid body material, the second layer of the rigid body material being located between the first layer of the rigid body material and the third layer of the rigid body material.

2. The device of claim 1, wherein a position of the gate transmission element is controllable between a first position and a second position using a gate pressure received through the fluidic gate such that:
   when in the first position, the gate transmission element is situated to at least substantially prevent fluid flow between the fluidic source and the fluidic drain, and
   when in the second position, the gate transmission element is situated to allow fluid flow between the fluidic source and the fluidic drain.

3. The device of claim 1, wherein the gate transmission element comprises a flange.

4. The device of claim 1, wherein the gate transmission element comprises:
   a gate portion located within a first layer of the rigid body material;
   a connecting portion in contact with the gate portion and located within a second layer of the rigid body material; and
   a closure portion in contact with the connecting portion and located within a third layer of the rigid body material.

5. The device of claim 4, wherein the gate portion comprises a first segment and a second segment, and the first segment is separated by a gap from the second segment.

6. A device, comprising:
   two or more stacked layers of a rigid body material forming a body, the body comprising:
   a chamber;
   a fluidic gate, a fluidic source, and a fluidic drain, each configured to be in fluid communication with the chamber; and
   a gate transmission element slidably disposed within the chamber, wherein a seal is disposed between adjacent layers peripheral to the chamber between each pair of adjacent layers, wherein the fluidic gate is disposed within a first layer of the rigid body material, the gate transmission element is disposed entirely within a second layer of the rigid body material, and the fluidic source and the fluidic drain are each disposed within a third layer of the rigid body material, the second layer of the rigid body material being located between the first layer of the rigid body material and the third layer of the rigid body material.

7. The device of claim 6, wherein the seal comprises a laser weld.

8. The device of claim 6, wherein the device is coupled to a fluidic haptics device responsive to a control signal received from an artificial reality system.

9. A fluidic valve comprising:
   a plurality of rigid layers bonded together in a stack configuration to form a body, wherein the body comprises:
   a chamber that is defined by at least one rigid layer of the plurality of rigid layers; and
   a fluidic gate, a fluidic source, and a fluidic drain, each of which is fluidically coupled with the chamber; and
   a gate transmission element slidably disposed within the chamber, wherein the gate transmission element is configured to regulate fluid flow between the fluidic source and the fluidic drain, wherein the fluidic gate is disposed within a first layer of the body, the gate transmission element is disposed entirely within a second layer of the body, and the fluidic source and the fluidic drain are each disposed within a third layer of the body, the second layer of the body being located between the first layer of the body and the third layer of the body.

* * * * *